(12) United States Patent
Yoshida et al.

(10) Patent No.: US 11,042,487 B2
(45) Date of Patent: *Jun. 22, 2021

(54) MEMORY SYSTEM AND METHOD FOR CONTROLLING NONVOLATILE MEMORY

(71) Applicant: Toshiba Memory Corporation, Tokyo (JP)

(72) Inventors: Hideki Yoshida, Yokohama Kanagawa (JP); Shinichi Kanno, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 16/555,663

(22) Filed: Aug. 29, 2019

(65) Prior Publication Data

US 2019/0384720 A1    Dec. 19, 2019

Related U.S. Application Data

(63) Continuation of application No. 15/820,573, filed on Nov. 22, 2017, now Pat. No. 10,445,246.

(30) Foreign Application Priority Data

Jul. 11, 2017    (JP) .............................. JP2017-135785

(51) Int. Cl.
*G06F 12/1009* (2016.01)
*G06F 12/02* (2006.01)

(52) U.S. Cl.
CPC ...... *G06F 12/1009* (2013.01); *G06F 12/0246* (2013.01); *G06F 2212/1016* (2013.01); *G06F 2212/657* (2013.01); *G06F 2212/7201* (2013.01); *G06F 2212/7203* (2013.01)

(58) Field of Classification Search
CPC .................................................. G06F 12/1009
USPC ........................................................ 711/103
See application file for complete search history.

(56) References Cited

U.S. PATENT DOCUMENTS

| 8,006,046 B2 | 8/2011 | Steinmetz et al. |
| 9,720,596 B1 | 8/2017 | Bono et al. |
| 2005/0097274 A1 | 5/2005 | Ohtani |
| 2012/0110239 A1* | 5/2012 | Goss ................... G06F 12/0246 711/103 |

FOREIGN PATENT DOCUMENTS

JP    2016-212713 A    12/2016

* cited by examiner

*Primary Examiner* — Jae U Yu
(74) *Attorney, Agent, or Firm* — White & Case LLP

(57) ABSTRACT

According to one embodiment, a memory system receives a write request specifying a first logical address to which first data is to be written, and a length of the first data, from a host. The memory system writes the first data to a nonvolatile memory, and stores a first physical address indicating a physical storage location on the nonvolatile memory to which the first data is written, and the length of the first data, in an entry of a logical-to-physical address translation table corresponding to the first logical address. When the memory system receives a read request specifying the first logical address, the memory system acquires the first physical address and the length from the address translation table, and reads the first data from the nonvolatile memory.

16 Claims, 15 Drawing Sheets

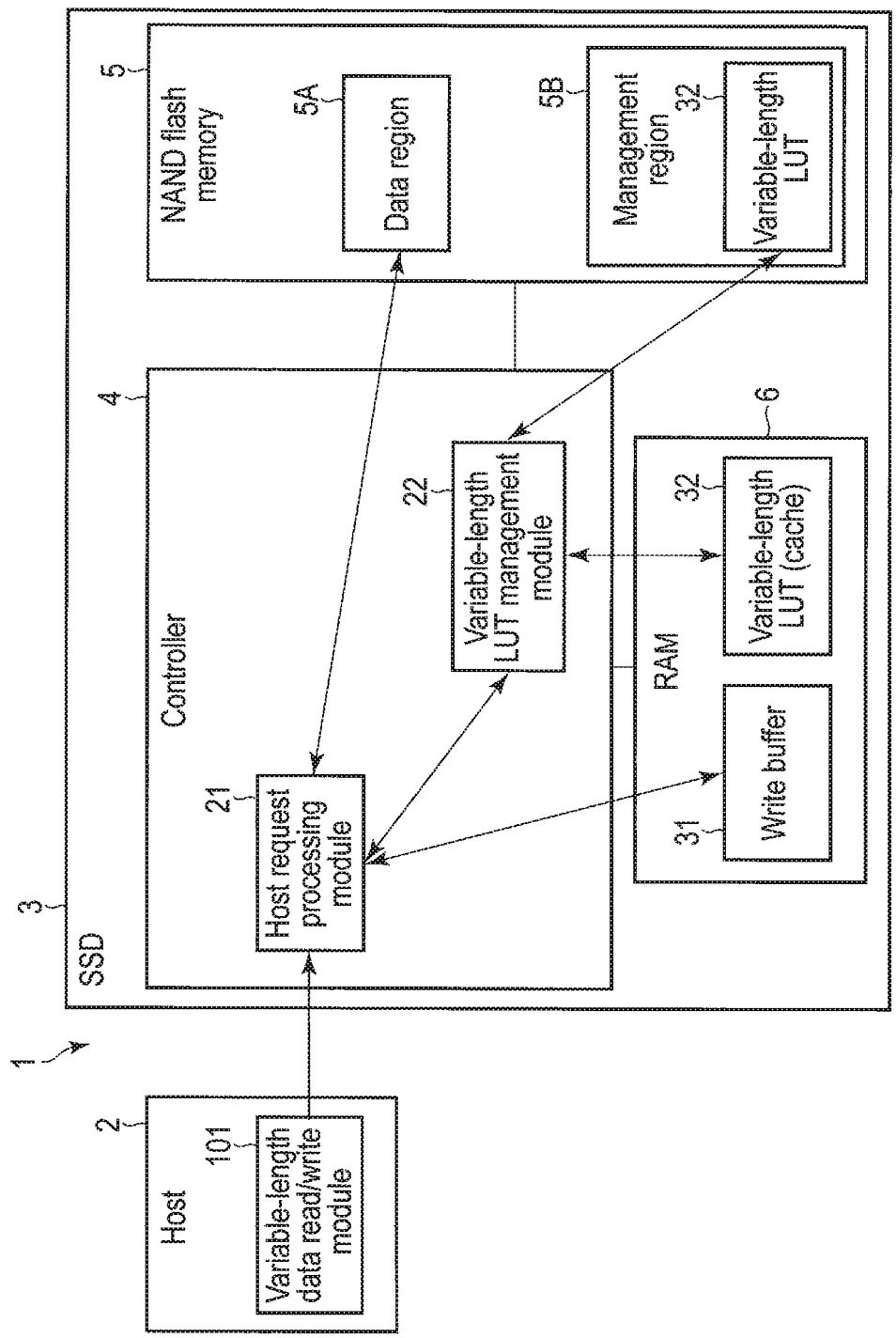
F I G. 1

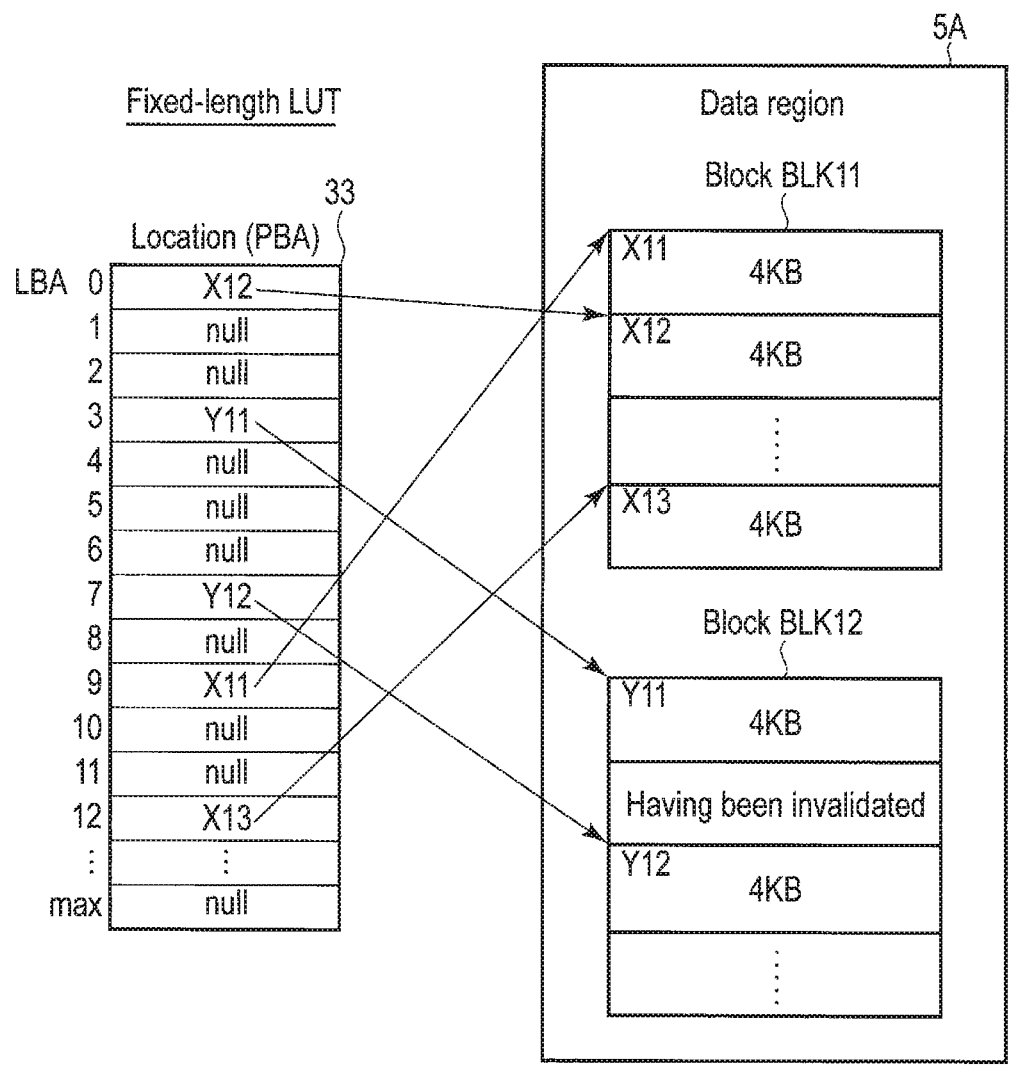
F I G. 3

Normal write command

| Parameter | Explanation |
|---|---|
| Starting LBA | Address of logical sector to which data is to be written first |
| Number of logical sectors | Number of logical sectors to which data is to be written, i.e., number of LBAs corresponding to write data |

Variable-length data write command

| Parameter | Explanation |
|---|---|
| Logical address | Address of one logical storage location to which data (variable-length data) is to be written |
| Data length | Length of data to be written to one logical storage location (data length can be specified in byte units or in units such as 256-byte units) |

F I G. 4

Normal read command

| Parameter | Explanation |
|---|---|
| Starting LBA | Address of first logical sector from which data is to be read |
| Number of logical sectors | Number of logical sectors from which data is to be read, i.e., number of LBAs corresponding to data to be read |

Variable-length data read command

| Parameter | Explanation |
|---|---|
| LBA | Address of one logical storage location from which data (variable-length data) to be read (data which has length managed by the variable-length LUT is read from nonvolatile memory) |

F I G. 5

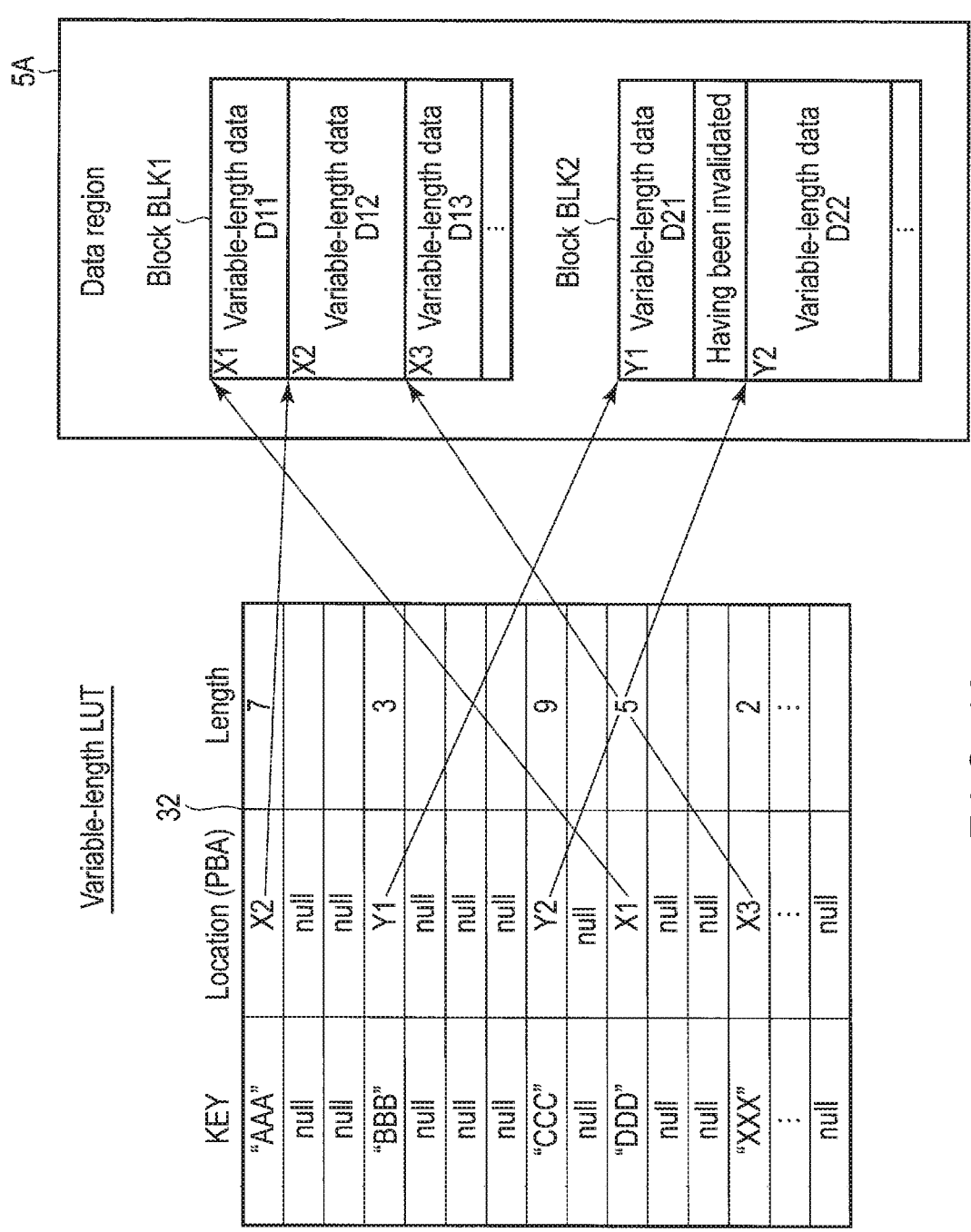
F I G. 10

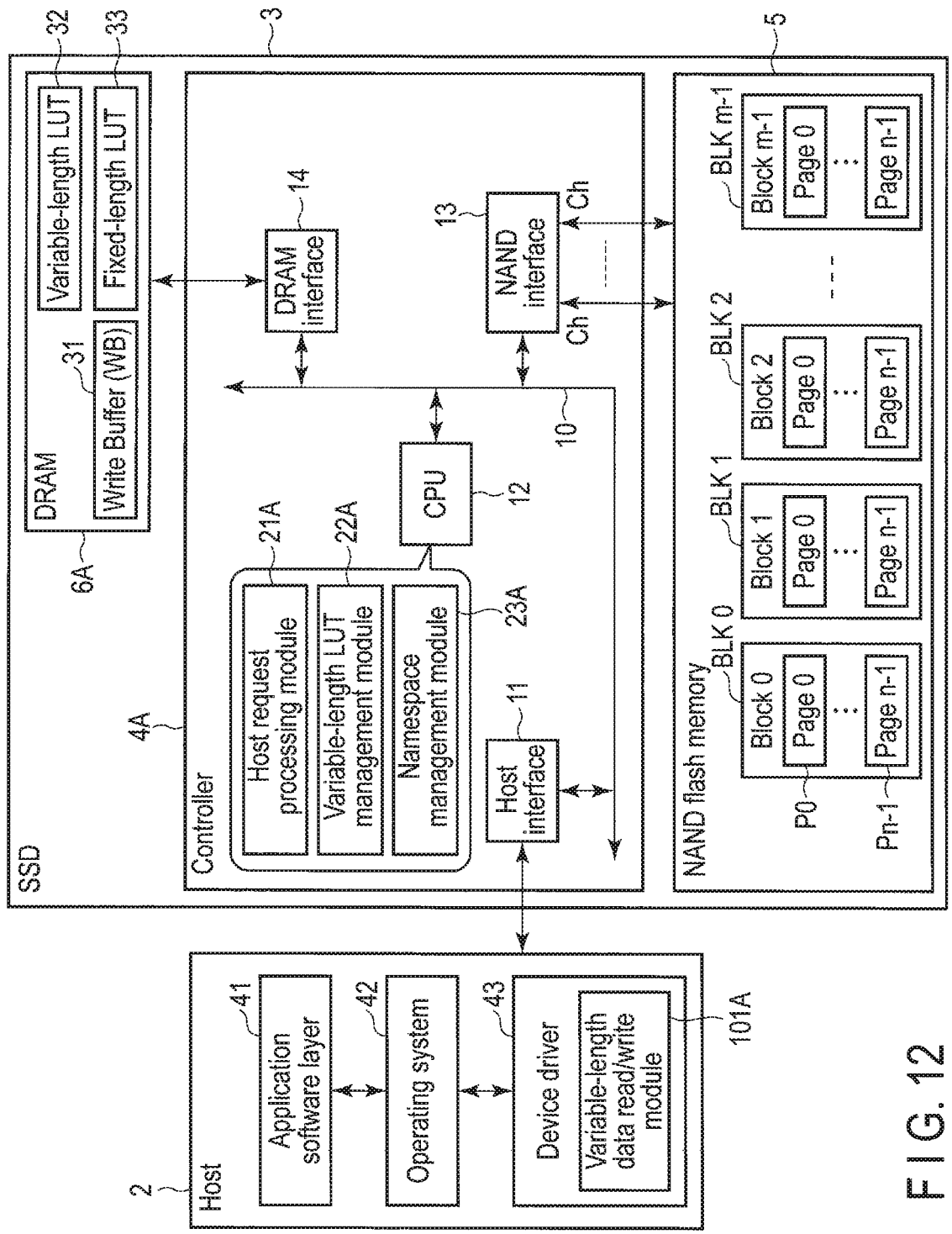
F I G. 12

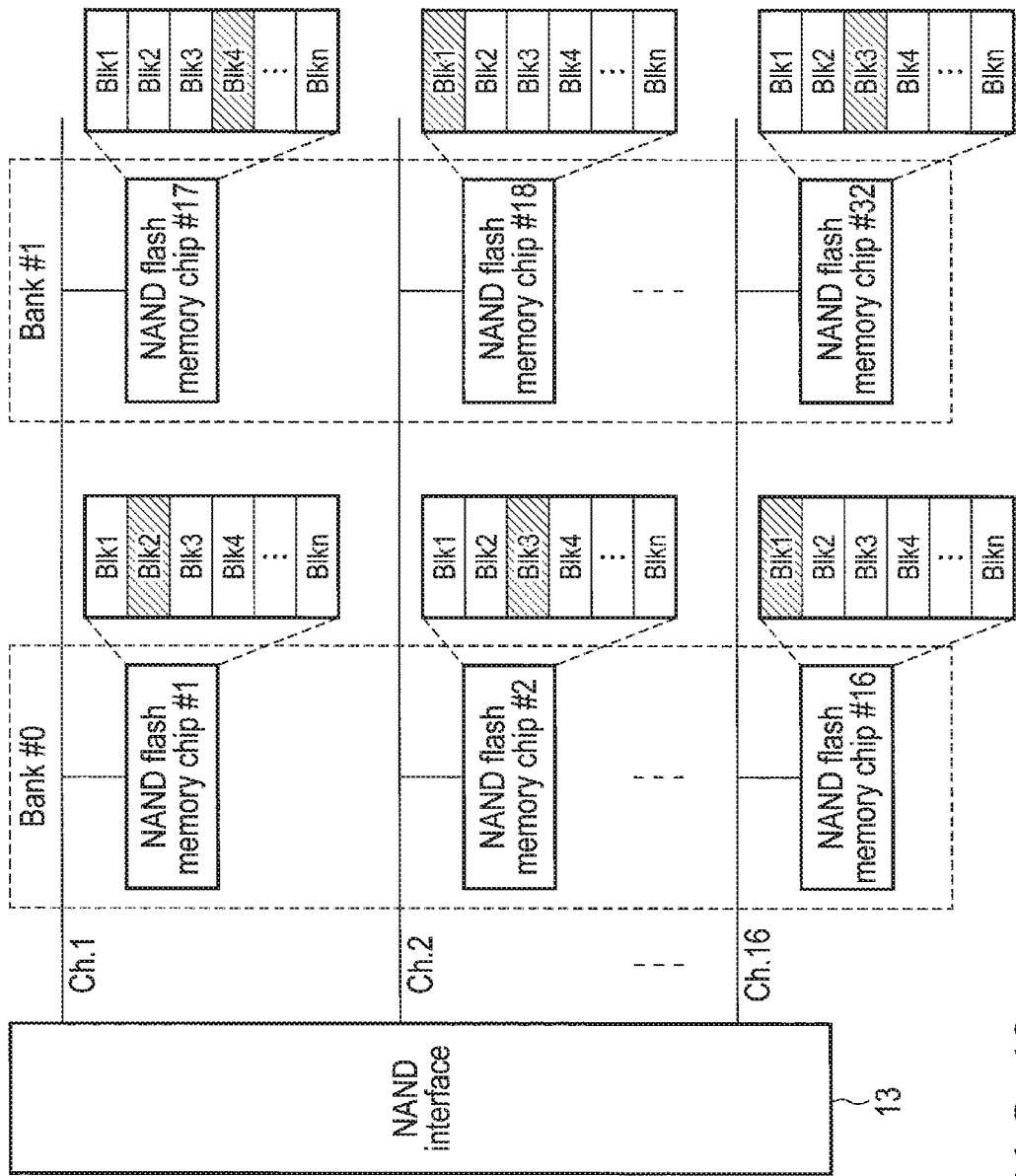
F I G. 13

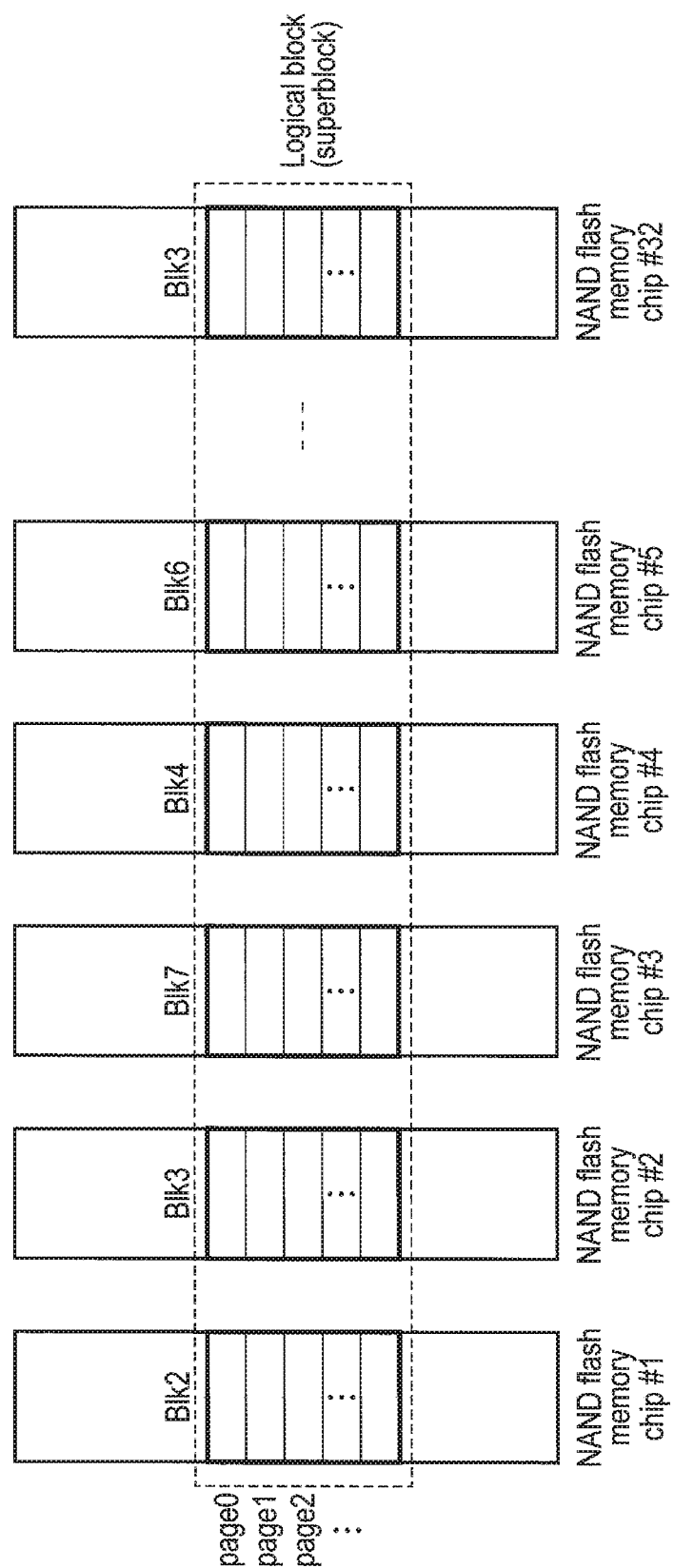
F I G. 14

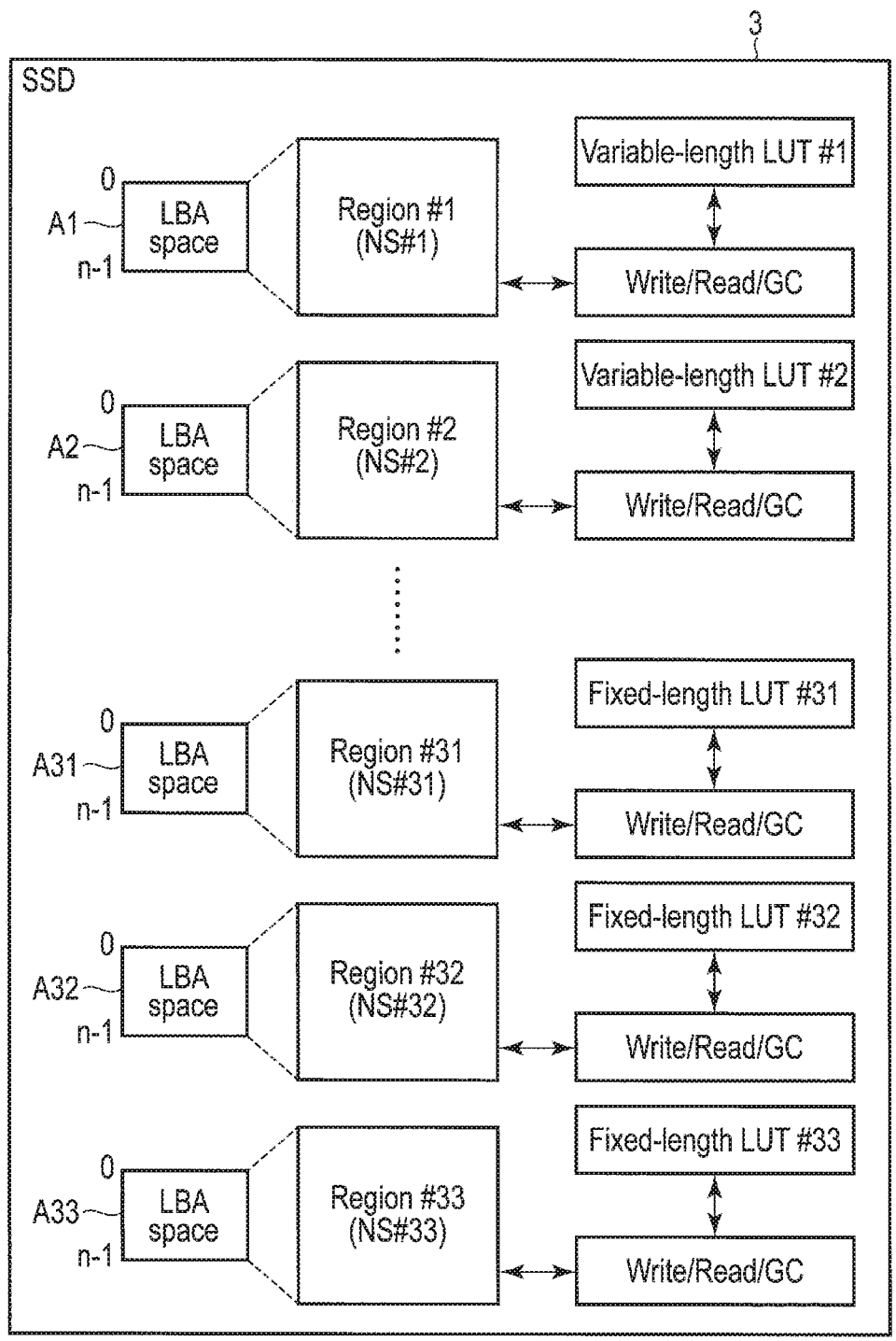
F I G. 16

MEMORY SYSTEM AND METHOD FOR CONTROLLING NONVOLATILE MEMORY

CROSS-REFERENCE TO RELATED APPLICATIONS

This application is a continuation of application Ser. No. 15/820,573, filed Nov. 22, 2017 and is based upon and claims the benefit of priority from Japanese Patent Application No. 2017-135785, filed Jul. 11, 2017, the entire contents of which are incorporated herein by reference.

FIELD

Embodiments described herein relate generally to a nonvolatile memory control technology.

BACKGROUND

Recently, memory systems including nonvolatile memories have been widely used as main storages of various information processing devices. As one of the memory systems, NAND flash technology-based solid-state drives (SSD) are known.

In a memory system such as an SSD, address translation for translating a logical address into a physical address of a nonvolatile memory is executed by using an address translation table.

In a normal address translation table, physical addresses corresponding to logical addresses are managed, respectively.

However, in a normal SSD, data corresponding to one logical address is fixed-length data, and arbitrary-length data cannot be written to an arbitrary logical address.

BRIEF DESCRIPTION OF THE DRAWINGS

FIG. 1 is a block diagram showing an example of the configuration of a memory system according to an embodiment.

FIG. 3 is a diagram showing an example of the configuration of a fixed-length lookup table.

FIG. 4 is a diagram showing an example of a variable-length data write request applied to the memory system of the embodiment.

FIG. 5 is a diagram showing an example of a variable-length data read request applied to the memory system of the embodiment.

FIG. 10 is a diagram showing another example of the configuration of the variable-length lookup table managed by the memory system of the embodiment.

FIG. 12 is a block diagram showing an example of the hardware configuration of the memory system of the embodiment.

FIG. 13 is a block diagram showing the relationship between a NAND interface and a plurality of NAND flash memory chips in the memory system of the embodiment.

FIG. 14 is a diagram showing an example of the configuration of a logical block (superblock) used in the memory system of the embodiment.

FIG. 16 is a block diagram showing the relationship between the plurality of regions, logical address spaces corresponding to the regions and lookup tables corresponding to the regions in the memory system of the embodiment.

DETAILED DESCRIPTION

Figure 2:
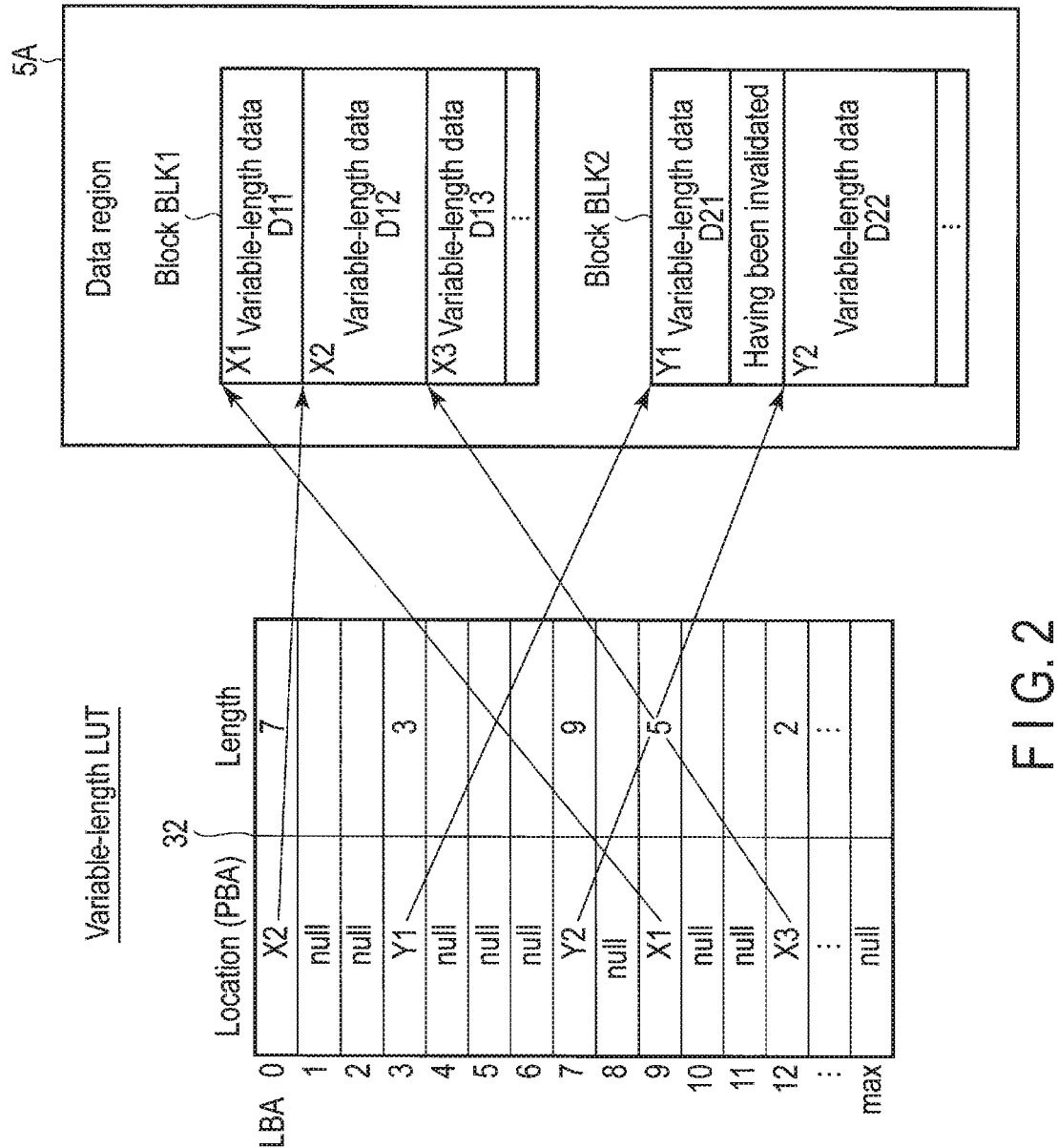
FIG. 2 is a diagram showing an example of the configuration of a variable-length lookup table managed by the memory system of the embodiment.

Various embodiments will be described hereinafter with reference to the accompanying drawings.

In general, according to one embodiment, a memory system connectable to a host includes a nonvolatile memory and a controller electrically connected to the nonvolatile memory and configured to control the nonvolatile memory. The controller is configured to manage a logical-to-physical address translation table including a plurality of entries corresponding to a plurality of logical addresses. The controller is configured to receive a write request specifying a first logical address to which first data is to be written, and a length of the first data, from the host. The controller is configured to write the first data to the nonvolatile memory, and to store a first physical address indicating a physical storage location on the nonvolatile memory to which the first data is written, and the length of the first data, in the entry of the logical-to-physical address translation table corresponding to the first logical address. The controller is configured, when receiving a read request specifying the first physical address from the host, to acquire the first physical address and the length from the logical-to-physical address translation table, and to read the first data from the nonvolatile memory based on the acquired first physical address and the acquired length.

Firstly, the configuration of an information processing system 1 including a memory system according to an embodiment will be described with reference to FIG. 1.

This memory system is a semiconductor storage device configured to write data to a nonvolatile memory and read data from the nonvolatile memory. This memory system may be realized as a solid-state drive (SSD) 3 including a NAND flash memory.

The information processing system 1 may include a host (host device) 2 and the SSD 3. The host 2 is an information processing device (computing device) which accesses the SSD 3. The host 2 may be a server computer which executes various user application programs or may be a personal computer. The SSD 3 can be used as the main storage of the information processing device functioning as the host 2. The SSD 3 may be built in this information processing device or may be connected to this information processing device via a cable or network.

As the interface for connecting the host 2 and the SSD 3 to each other, SCSI, Serial Attached SCSI (SAS), ATA, Serial ATA (SATA), PCI Express (PCIe), Ethernet (registered trademark), Fibre Channel, NVM Express (NVMe) (registered trademark), etc., can be used.

The host 2 includes a variable-length data read/write module 101. The variable-length data read/write module 101 may be realized as software which operates on the host 2 (for example, the server computer). For example, in the case of using the SSD 3 to store a file or store data for a block device, the variable-length data read/write module 101 may be realized as part of an operating system executed by the host 2 or may be realized as part of a device driver executed by the host 2. Alternatively, the variable-length data read/write module 101 may be realized as part of a specific application program.

The SSD 3 includes a controller 4 and a nonvolatile memory (NAND flash memory) 5. The controller 4 is a memory controller which controls the NAND flash memory 5 and may be realized by a circuit referred to as a system LSI (referred to also as a "control circuit" or a "processing circuit"), for example.

The SSD 3 further may include a random access memory (RAM) 6. The RAM 6 may be a DRAM connected to the controller 4 or may also be an SRAM built in the controller 4.

The controller 4 includes a host request processing module 21 and a variable-length lookup table (LUT) management module 22. Each of the host request processing module 21 and the variable-length LUT management module 22 may be realized by firmware executed by a CPU in the controller 4. Alternatively, all or part of each of the host request processing module 21 and the variable-length LUT management module 22 may be realized by hardware in the controller 4.

The regions (storage regions) in the NAND flash memory 5 can be generally classified into a data region 5A and a management region 5B. The data region 5A is a region for storing data (user data) from the host 2. The management region 5B is a region for storing management information for managing an operation of the SSD 3. As the example of the management information, variable-length lookup table (LUT) 32 is included.

The variable-length LUT 32 is a logical-to-physical address translation table including a plurality of entries corresponding to a plurality of logical addresses, and is used for managing correspondences between a plurality of logical addresses and a plurality of physical addresses on the NAND flash memory 5. The variable-length LUT 32 is stored in the management region 5B of the NAND flash memory 5. To increase the speed of read/write access to the variable-length LUT 32, a copy of part or all of the variable-length LUT 32 may be stored in the RAM 6 as a cache (logical-to-physical address translation table cache). Another part of the region of the RAM 6 may be used as a write buffer 31 for temporarily storing write data.

To improve the efficiency of a write operation to the NAND flash memory 5, which is a nonvolatile memory where a write order is restricted, it is necessary to dynamically change the correlation between a logical storage location (logical address) specified by the host 2 and a physical storage location (physical address) on the NAND flash memory 5. Therefore, in general, the correlations between logical addresses and physical addresses are managed, respectively, by a lookup table (logical-to-physical address translation table). In the case of writing data, the lookup table is updated, and the physical storage location (physical address) on the NAND flash memory 5 to which the data is written is associated with the logical address specified by the host. In the case of reading data, the lookup table is referred to, and the physical storage location (physical address) on the NAND flash memory 5 from which the data to be read is stored is acquired from the lookup table. A logical block address (LBA) may be used as the logical address, for example.

A normal lookup table manages the correlations between LBAs and physical addresses, respectively, in fixed-length units (for example, in 4 KB units). It is because an existing SSD provides an LBA, which is derived from a fixed-length sector of a hard disk, as an interface. Therefore, in the existing SSD, data which can be written to a logical storage location corresponding to one LBA is limited to fixed-length data. The fixed-length data means that the length of data corresponding to one logical address is fixed. For example, if one logical address (for example, one LBA) indicates a logical sector with a fixed-length (for example, 4 KBytes), data which can be written to a physical storage location corresponding to this LBA is limited to fixed-length data having this fixed size (for example, 4 KBytes). This interface is sufficient when the user wishes to store fixed-size data, i.e., fixed-length data to one logical address.

However, in the case of a system which handles variable-length data, a host needs to execute processing for converting variable-length data to fixed-length data, processing for managing metadata indicating which variable-length data is stored, in which fixed-length data the variable-length data is stored, and in which location in the fixed-length data the variable-length data is stored, etc.

The variable-length data means that the length of data corresponding to one logical address is variable.

For example, the length of a value is variable in a key-value store system. Further, in a case where a host compresses data and stores the compressed data in an SSD, the length of the compressed data varies depending on the compression ratio. In a case where an SSD has a compression function, the length of compressed data also varies.

Therefore, in such a system, a host needs to execute complicated processing such as (1) processing for dividing large variable-length data into fixed-length data portions (block data portions), (2) processing for integrating small variable-length data portions or adding dummy data to small variable-length data, and converting the small variable-length data to fixed-length data, and (3) processing for separately managing metadata indicating which variable-length data is stored, in which fixed data the variable-length data is stored, and in which location in the fixed data the fixed-length data is stored.

Further, also in a normal file system, since a file size varies from file to file, the above-described complicated processing needs to be executed.

This processing leads to inefficiency such as (1) an increase of the processing time of the CPU of the host, (2) an increase of the memory access time by reading/writing metadata, (3) an increase of the consumption of a memory resource by wring metadata/dummy data, (4) an increase of write amplification by the increase of the consumption of the memory resource, and (5) a reduction of the lifespan of the SSD by the increase of write amplification.

In the present embodiment, the SSD 3 is configured to store information indicating from which physical storage location on the NAND flash memory 5 data is stored and in what length the data is stored thereon, in the variable-length LUT 32, and in this way, arbitrary-length data can be stored at an arbitrary logical address. In other words, according to the variable-length LUT 32, a physical storage region having a size corresponding to an arbitrary data length specified by the host 2 can be allocated to a logical storage location in the SSD 3 corresponding to a certain logical address. Therefore, even in the case of writing variable-length data smaller than fixed-length data, this variable-length data can be written to an arbitrary logical address without executing the processing for adding dummy data to this variable-length data and converting this variable-length data to fixed-length data. Therefore, it is possible to allocate only a physical storage region necessary for storing data in the NAND flash memory 5.

Generally, if a storage system configured to store variable-length data in such a manner is achieved, the following problems arise when the size of previous data (old data) corresponding to a certain LBA and the size of new data (updated data) corresponding to this LBA are different from each other: (1) the new data does not fit in the region in which the previous data has been stored, (2) an empty space is created in part of the region in which the previous data has been stored, etc. Therefore, in a normal film system, in many cases, write data is divided into fixed-length data portions and the fixed-length data portions are stored in a storage by executing the previously-described complicated processing.

However, in the NAND flash memory 5, data can only be written from the beginning of a block in the NAND flash memory 5. Therefore, in the case of updating data, old data is left in an original physical storage location and new data is written to another physical storage location, and the old data will be erased by garbage collection when necessary. Therefore, in an SSD which writes data to the NAND flash memory 5, the above-described problems that (1) new data does fit in a region in which previous data is stored and (2) an empty space is created in part of the region in which the previous data is stored will not occur in the first place. This can be said to be unique characteristics of a system which manages variable-length data using a nonvolatile memory where a write order is restricted.

In the information processing system 1 shown in FIG. 1, the variable-length data read/write module 101 of the host 2 requests the SSD 3 to write or read variable-length data. As described above, variable-length data means that the length of data corresponding to one logical address is variable. A variable-length data write request specifies a logical address to which data (write data) is to be written and a length of the write data (that is, the length of the data to be written to the logical address). A variable-length data read request may only specify a logical address of data to be read.

In the SSD 3, the host request processing module 21 of the controller 4 receives a write request from the host 2. The host request processing module 21 writes write data (variable-length data Dx) received from the host 2 to the NAND flash memory 5.

More specifically, the host request processing module 21 writes the write data (variable-length data Dx) to a current write destination block allocated from a group of free blocks of the NAND flash memory 5.

Subsequently, in cooperation with the variable-length LUT management module 22, the host request processing module 21 stores a physical address indicating a physical storage location on the NAND flash memory 5 to which the write data (variable length data Dx) is written, and a data length (write data length) specified by the write request, in an entry in the variable-length LUT 32 corresponding to a logical address specified by the write request.

If receiving a read request specifying this logical address from the host 2, the host request processing module 21 acquires, from the variable-length LUT 32, the physical address indicating the physical storage location on the NAND flash memory 5 in which the variable-length data Dx is stored, and the data length of the variable-length data Dx. The physical storage location in which the variable-length data Dx is stored is the starting location of the region in the NAND flash memory 5 in which the variable-length data Dx is stored. Based on the acquired physical address and the acquired data length, the host request processing module 21 reads the variable-length data Dx from the NAND flash memory 5 and returns the read variable-length data Dx to the host 2.

FIG. 2 shows an example of the configuration of the variable-length LUT 32.

The variable-length LUT 32 includes the same number of LUT entries as the number of logical addresses (for example, here, LBA 0 to LBA max). The LUT entries are associated with the LBAs, respectively. Each LUT entry may include a location field for managing a location (physical storage location) on the NAND flash memory 5 in which data is stored, and a length field for managing a length of the data.

The location on the NAND flash memory 5 may be represented by a physical address (PBA) indicating a block number and a location in the block. The block number indicates a block in the NAND flash memory 5 to which the data is written. The location in the block indicates a location in the block (offset position in the block) to which the data is written.

The location in the block may be represented by the number of bytes from the beginning of the block to the location in the block. In this way, a location in a block can be managed in small granularity, i.e., in byte units, and as a result, data can be densely arranged in the NAND flash memory 5. As a matter of course, to reduce the amount of data needed to be stored in the LUT entry, the location in the block may be managed in such granularity as 256-byte units, for example.

Alternatively, the location on the NAND flash memory 5 may be represented by a physical address (PBA) indicating a block number, a page number in the block, and a location in the page. The page number in the block indicates the first page to which the data is written. The location in the page indicates the location in the page (offset location in the page) to which the data is written.

The location in the page may be represented by the number of bytes from the beginning of the page to the location in the page. In this way, data can be densely arranged in the NAND flash memory 5. As a matter of course, to reduce the amount of data needed to be stored in the LUT entry, the location in the page may be managed in such granularity as 256-byte units, for example.

In an LUT entry corresponding to a logical address to which data is not written, a predetermined constant value (e.g., null) may be stored as a location.

The length of data specified by a write request may also be represented by the number of bytes or may also be represented in units such as 256-byte units.

As shown in FIG. 2, if variable-length data D11 corresponding to the LBA 9 is written to a region starting from the beginning of a block BLK1, a physical address (PBA) indicating a starting location X1 of the block BLK1, and a length of the variable-length data D11 (here, the length is represented as "5") are stored in an LUT entry corresponding to the LBA 9.

If variable-length data D12 corresponding to the LBA 0 is written to a region starting from a location X2 of the block BLK1, a physical address (PBA) indicating the location X2, and a length of the variable-length data D12 (here, the length is represented as "7") are stored in an LUT entry corresponding to the LBA 0. The location X2 may be a location in the block BLK1 which is derived by addition of the length of the variable-length data D11 to the location X1.

If variable-length data D13 corresponding to the LBA 12 is written to a region stating from a location X3 of the block BLK1, a physical address indicating the location X3, and a length of the variable-length data D13 (here, the length is represented as "2") are stored in an LUT entry corresponding to the LBA 12. The location X3 may be a location in the block BLK1 which is derived by addition of the length of the variable-length data D12 to the location X2.

If variable-length data D21 corresponding to the LBA 3 is written to a region starting from the beginning of a block BLK2, a physical address indicating a starting location Y1 of the block BLK2, and a length of the variable-length data D21 (here, the length is represented as "3") are stored in an LUT entry corresponding to the LBA 3.

If variable-length data D22 corresponding to the LBA 7 is written to a region starting from a location Y2 of the block BLK2, a physical address indicating the location Y2 of the block BLK2, and a length of the variable-length data D22 (here, the length is represented as "9") are stored in an LUT entry corresponding to the LBA 7.

The variable-length LUT 32 may be realized by a multi-level address translation table (hierarchical LUT) including a plurality of hierarchical tables. In this case, instead of securing a region necessary for storing the whole variable-length LUT 32 on the NAND flash memory 5 or the RAM 6, it is only necessary to secure a region necessary for storing table data portions in the variable-length LUT 32 corresponding respectively to logical address ranges in which data are actually stored on the NAND flash memory 5 or the RAM 6. Therefore, it is not necessary to allocate a physical resource for storing address translation information corresponding to a logical address range in which data is not stored. For this reason, the use of the hierarchical LUT is especially beneficial to such a system as a key-value store where variable-length data are coarsely arranged.

Generally, it is desired that not only variable-length data but also fixed-length data are read and written. Therefore, instead of managing the whole SSD 3 by one LUT, a plurality of LUTs may be provided, and a fixed-length LUT and a variable-length LUT may be used in combination. The SSD 3 may have a multi-namespace control function. With the multi-namespace control function, to handle one storage device as if it were a plurality of drives, a plurality of logical address spaces (LBA spaces) can be allocated to the SSD 3. A plurality of namespaces can function as if they were a plurality of independent SSDs (virtual SSDs). When the host 2 requests the SSD 3 to create a namespace, the host 2 may specify a type of a namespace to be created (a namespace of a type #1 for handling fixed-length data or a namespace of a type #2 for handling variable-length data).

A plurality of LUTs corresponding to a plurality of namespaces are managed in the SSD 3. The LUT for each namespace of the type #2 for handling the variable-length data is realized by the variable-length LUT 32. The LUT for each namespace of the type #1 for handling the fixed-length data is realized by a fixed-length LUT 33 shown in FIG. 3.

In the namespace of the type #1, the length of data storable in the logical storage location corresponding to one LBA is fixed. In FIG. 3, it is assumed that the length of data storable in the logical storage location corresponding to one LBA is 4 KBytes (4 KB).

As shown in FIG. 3, the fixed-length LUT 33 includes the same number of LUT entries as the number of logical addresses (for example, here, LBA 0 to LBA max). The LUT entries are associated with the LBAs, respectively. In each LUT entry, a location (physical address (PBA)) on the NAND flash memory 5 in which data is stored is stored.

Locations (physical storage locations) on the NAND flash memory 5 managed in the fixed-length LUT 33 are locations aligned with 4 KBytes boundaries.

If 4 KB data corresponding to the LBA 9 is written to a 4 KB region starting from the beginning of a block BLK11, a physical address indicating a starting location X11 of the block BLK11 is stored in an LUT entry corresponding to the LBA 9.

If 4 KB data corresponding to the LBA 0 is written to a 4 KB region starting from a location X12 of the block BLK11, a physical address indicating the location X12 is stored in an LUT entry corresponding to the LBA 0.

If 4 KB data corresponding to the LBA 12 is written to a 4 KB region starting from a location X13 of the block BLK11, a physical address indicating the location X13 is stored in an LUT entry corresponding to the LBA 12.

If 4 KB data corresponding to the LBA 3 is written to a 4 KB region starting from the beginning of a block BLK12, a physical address indicating a starting location Y11 of the block BLK 12 is stored in the LUT entry corresponding to the LBA 3.

If 4 KB data corresponding to the LBA 7 is written to a 4 KB region starting from a location Y12 of the block BLK12, a physical address indicating the location Y12 of the block BLK12 is stored in an LUT entry corresponding to the LBA 7.

FIG. 4 shows a normal write request (normal write command) and a variable-length write request (variable-length data write command).

The normal write command requests the SSD 3 to write fixed-length data where the length of data per logical address is fixed.

As shown in the upper part of FIG. 4, the normal write command includes a parameter specifying a starting LBA and a parameter specifying a number of logical sectors. The starting LBA is the address of the logical sector to which data is to be written first. The number of logical sectors indicates the number of logical sectors to which data is to be written, i.e., the number of LBAs corresponding to the write data. The size of write data which the host 2 can transmit to the SSD 3 is limited to a multiple of the fixed length (for example, a multiple of 4 KB).

The variable-length data write command requests the SSD 3 to write variable-length data where the length of data per logical address is variable.

As shown in the lower part of FIG. 4, the variable-length data write command includes a parameter specifying a logical address, and a parameter specifying a data length. The logical address is the address of one logical storage location (variable-length logical storage location) to which data (variable-length data) is to be written. The data length indicates the length of data to be written to one logical storage location. The data length can be specified in units smaller than the length of the fixed-length data (for example, 4 KB) such as byte units or can also be specified in such units as 256-byte units.

FIG. 5 shows a normal read request (normal read command) and a variable-length data read request (variable-length data read command).

The normal read command requests the SSD 3 to read fixed-length data where the length of data per logical address is fixed.

As shown in the upper part of FIG. 5, the normal read command includes a parameter specifying a starting LBA and a parameter specifying the number of logical sectors. The starting LBA is the address of the logical sector from which data is to be read first. The number of logical sectors indicates the number of logical sectors from which data is to be read, i.e., the number of LBAs corresponding to the data to be read. The size of data which the host 2 can read from the SSD 3 is limited to a multiple of the fixed length (for example, a multiple of 4 KB).

The variable-length data read command requests the SSD 3 to read variable-length data where the length of data per logical address is variable.

As shown in the lower part of FIG. 5, the variable-length data read command includes a parameter specifying a logical address (for example, an LBA). The logical address (for example, the LBA) is the address of one logical storage location (variable-length logical storage location) from which data (variable-length data) is to be read. The variable-length data stored in the one logical storage location (the length of the data is managed by the variable-length LUT 32) is read from the NAND flash memory 5.

As the variable-length data write request and the variable-length data read request, a new expanded write command and a new expanded read command where a write command and a read command standardized by an existing protocol such as NVMe or SCSI are expanded can be used. Alternatively, a unique protocol may be developed for the variable-length data write request and the variable-length data read request.

Figure 6:
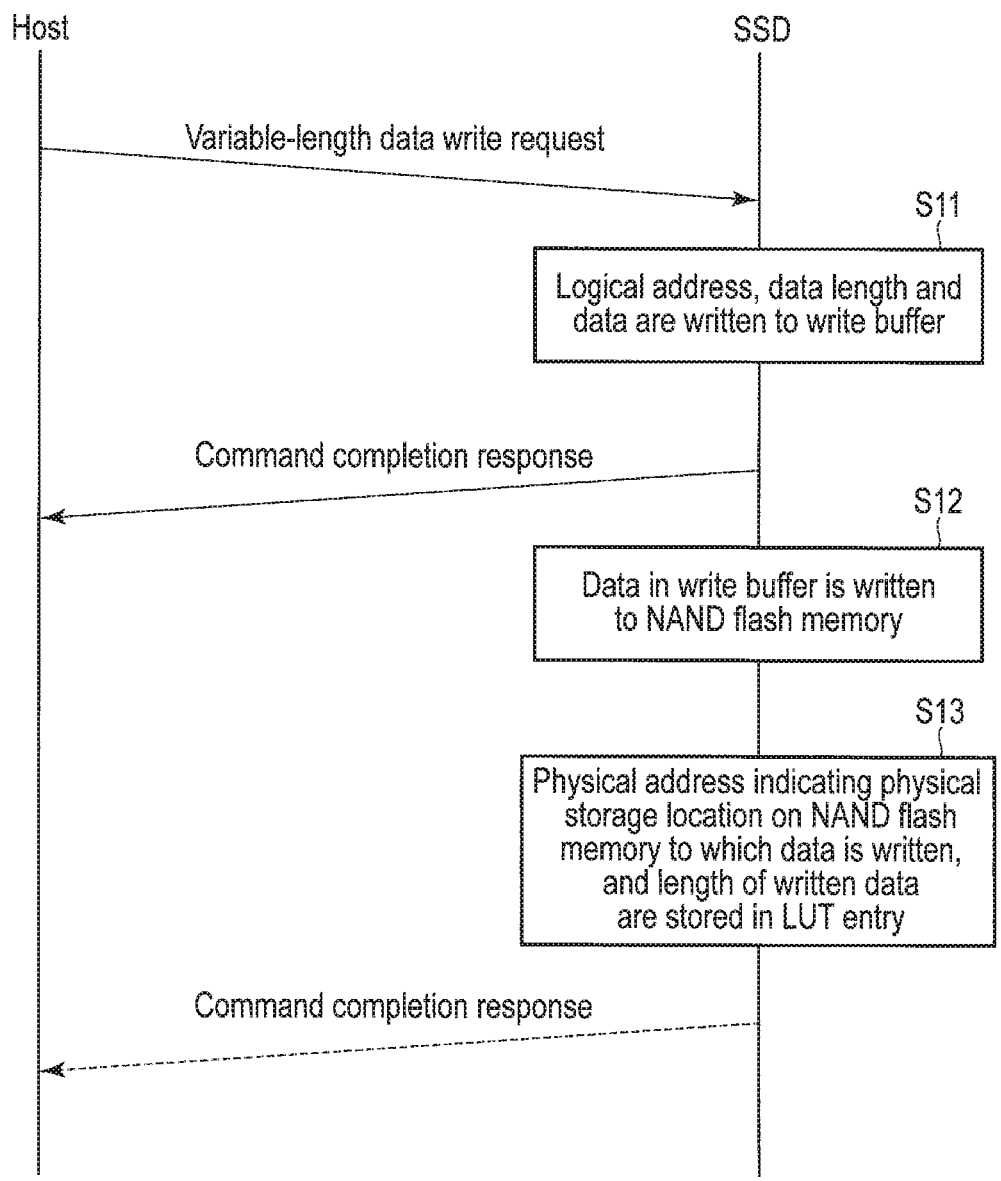
FIG. 6 is a sequence diagram showing the procedure of a write operation executed by the memory system of the embodiment.

FIG. 6 is a sequence diagram showing the procedure of a write operation.

If the host 2 wishes to write variable-length data, the variable-length data read/write module 101 transmits a variable-length data write request specifying a logical address to which write data (variable-length data) is to be written and a length (data length) of the write data, to the SSD 3. The write request may further include write data, or in place of write data, the write request may further include only a parameter indicating a location on a host memory (memory in the host 2) in which the write data exists.

When the host request processing module 21 of the SSD 3 receives the variable-length data write request from the host 2, the host request processing module 21 writes the logical address, the data length and the write data, to the write buffer 31 (Step S11). Subsequently, the host request processing module 21 returns a command completion response including a return value indicating whether processing is normally executed in response to the write request or not, to the host 2.

After that, at an appropriate time (for example, a time when the write buffer 31 is filled with data to be written, a time when a certain time passes after the write request is received, a time when a flash command requesting a write of data, which is not written to the NAND flash memory 5, to the NAND flash memory 5 is received from the host 2, etc.), the host request processing module 21 writes the write data of the write buffer 31 to the data region 5A of the NAND flash memory 5 (Step S12). In Step S12, the write data is written to a region starting from the next available physical storage location in the current write destination block.

The next available physical storage location in the current write destination block may be managed by the variable-length LUT management module 22. The variable-length LUT management module 22 determines a physical storage location to which the write data is to be written such that data is arranged in order from the beginning of the current destination block. If the length of write data is greater than the capacity of the remaining available region of the current destination block, one free block is selected from a group of free blocks in the NAND flash memory 5, and the selected free block is allocated as a new write destination block. In Step S12, the host request processing module 21 may notify the logical address and the data length specified by the write request to the variable-length LUT management module 22, and may acquire the physical storage location on the NAND flash memory 5 to which the write data to be written from the variable-length LUT management module 22.

Next, a physical address indicating the physical storage location on the NAND flash memory 5 to which the write data is written and a length of the write data are stored in an LUT entry (Step S13). This processing may be executed by the variable-length LUT management module 22.

Instead of returning a command completion response to the host 2 immediately after executing the processing of Step S11, a command completion response may be returned to the host 2 immediately after the processing of Step S13 is executed.

Further, to avoid wasting the write destination block or to handle write data (variable-length data) greater than the capacity of one block, a plurality of locations and a plurality of lengths may be stored in one LUT entry of the variable-length LUT 32 such that the write data (variable-length data) can be written across a plurality of blocks.

Still further, if new variable-length data is overwritten to a physical address to which variable-length data is already written, previous variable-length data will be invalidated. If the number of free blocks is reduced to a certain number or less, garbage collection (GC) is executed with respect to some blocks containing a large volume of invalidated data. In the GC, only valid data in these blocks (GC source blocks) containing a large volume of invalidated data are copied to a GC destination block (free block), and these GC source blocks are changed to free blocks, accordingly.

Figure 7:
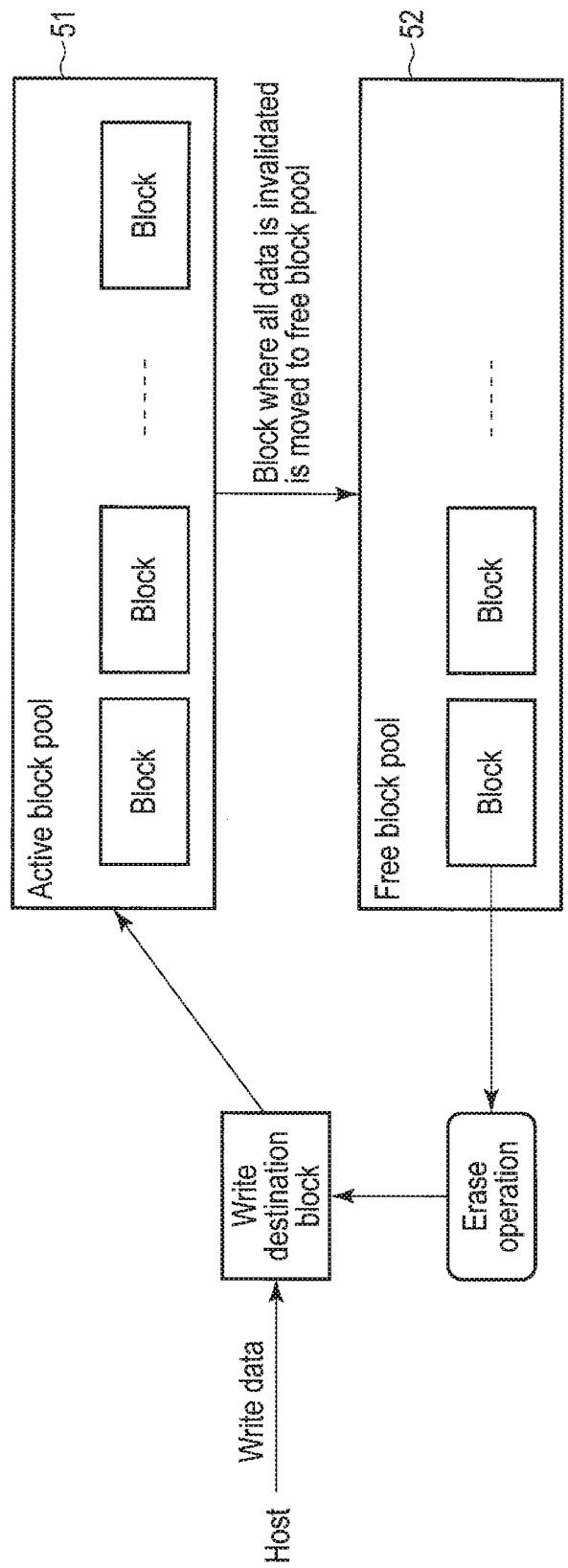
FIG. 7 is a diagram showing the relationship between a free block pool, an active block pool and a write destination block managed by the memory system of the embodiment.

FIG. 7 shows the relationship between an active block pool 51, a free block pool 52 and a write destination block managed by the controller 4 of the SSD 3.

The state of each block is generally classified into an active block which stores valid data and a free block which does not store valid data. Each block as the active block is managed by a list referred to as the active block pool 51. On the other hand, each block as the free block is managed by a list referred to as the free block pool 52.

In the present embodiment, the controller 4 allocates one block (free block) selected from the free block pool 52 as a write destination block to which write data received from the host 2 is to be written. In this case, the controller 4 firstly executes an erase operation to the selected block (free block), and changes the block to an erased state where data can be written, accordingly. If the current write destination block is completely filled with write data from the host 2, the controller 4 moves the current write destination block to the active block pool 51, and allocates one new block (free block) from the free block pool 52 as a new write destination block.

If all valid data in a certain block in the active block pool 51 is invalidated by data update, unmapping, garbage collection, etc., the controller 4 moves the block to the free block pool 52.

Figure 8:
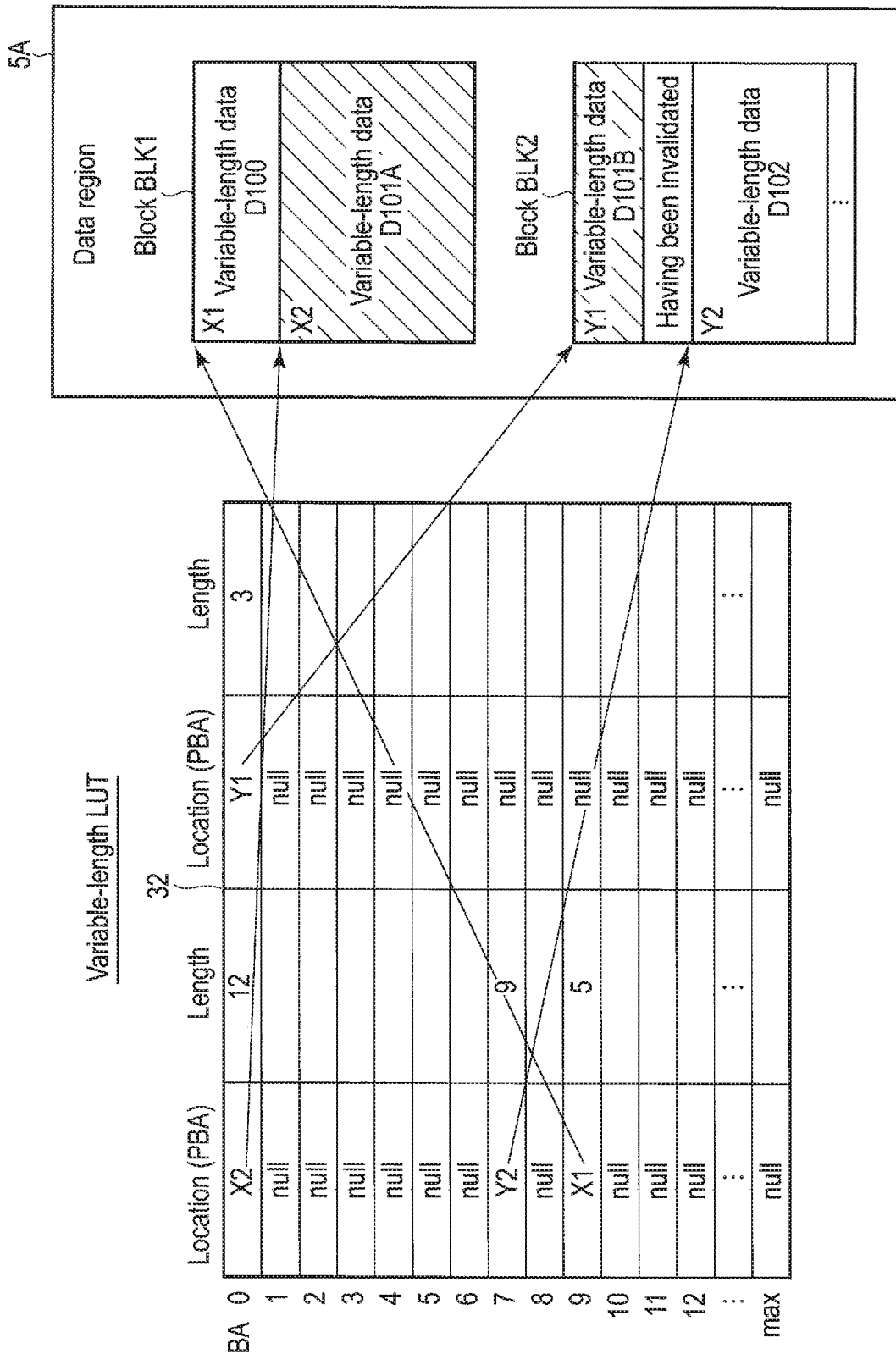
FIG. 8 is a diagram showing another example of the configuration of the variable-length lookup table managed by the memory system of the embodiment.

FIG. 8 shows another example of the configuration of the variable-length LUT 32.

The variable-length LUT 32 is configured to store a plurality of locations and a plurality of lengths. In FIG. 8, the variable-length LUT 32 has such a configuration that two locations and two lengths can be stored in each LUT entry such that certain write data (variable-length data) can be written across two blocks. Note that the number of location-and-length sets stored in each LUT entry is not limited to two and may be three or more.

If variable-length data D100 corresponding to the LBA 9 is written to a region starting from the beginning of a block BLK1, a physical address indicating a starting location X1 of the block BLK1 and a length of the variable-length data D100 (here, the length is represented as "5") are stored in an LUT entry corresponding to the LBA 9.

If the length of variable-length data D101 corresponding to the LBA 0 is greater than the size of the remaining region of the block BLK1, only part of the variable-length D101 (variable-length data D101A) is written to a region starting from a location X2 of the block BLK1. In this case, a physical address indicating the location X2 and a length of the variable-length data D101A (here, the length is represented as "12") are stored in an LUT entry corresponding to the LBA 0. The remaining part of the variable-length data D101 (variable-length data D101B) is written to another block BLK2. If the variable-length data D101B is written to a region starting from the beginning of the block BLK2, a physical address indicating a starting location Y1 of the block BLK2 and a length of the variable-length data D101B (here, the length is represented as "3") are further stored in the LUT entry corresponding to the LBA 0.

That is, the host request processing module 21 firstly compares the length of the variable-length data D101 specified by the write request, with the size of the remaining region of the block BLK1. The block BLK1 is the current write destination block. If the length of the variable-length data D101 exceeds the size of the remaining region of the block BLK1, the host request processing module 21 divides the variable-length data D101 into the variable-length data D101A and the variable-length data D101B. The variable-length data D101A is data having a data length corresponding to the size of the remaining region of the block BLK1. The variable-length data D101B is data remaining in the variable-length data D101. The host request processing module 21 writes the variable-length data D101A to the block BLK1 and writes the variable-length data D101B to the block BLK2 allocated as a new write destination block. Subsequently, the host request processing module 21 updates the variable-length LUT 32, and stores the physical address indicating the location (physical storage location) X2 to which the variable-length data D101A is written, the length of the variable-length data D101A, the physical address indicating the location (physical storage location) Y1 to which the variable-length data D101B is written, and the length of the variable-length data D101B, in the LUT entry corresponding to the LBA 0.

If receiving a read request specifying the LBA 0, the host request processing module 21 acquires the physical address indicating the location X1 in which the variable-length data D101A is stored, the length of the variable-length data D101A, the physical address indicating the location Y1 in which the variable-length data D101B is stored, and the length of the variable-length data D101B, from the variable-length LUT 32. Subsequently, the host request processing module 21 reads the variable-length data D101A and the variable-length data D101B, respectively, from the block BLK1 and the block BLK2, combines the variable-length data D101A with the variable-length data D101B, and reproduces the data D101, and then returns the reproduced data D101 to the host 2.

Figure 9:
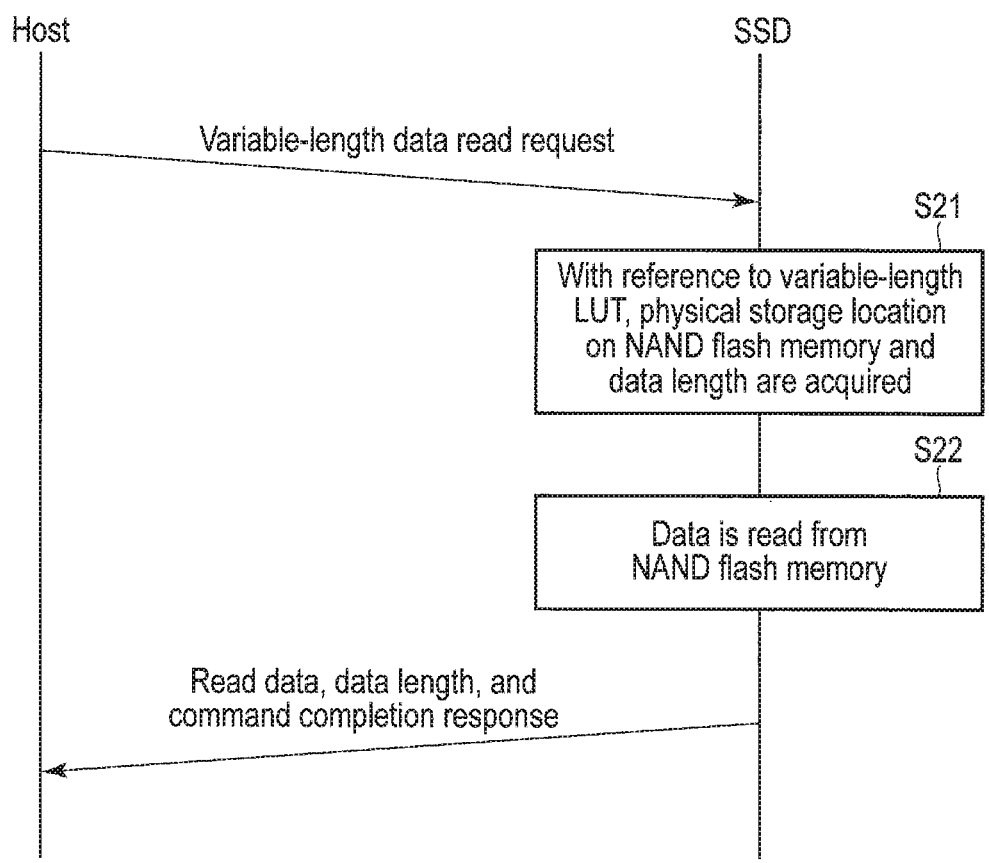
FIG. 9 is a sequence diagram showing the procedure of a read operation executed by the memory system of the embodiment.

FIG. 9 is a sequence diagram showing the procedure of a read operation.

If the host 2 wishes to read variable-length data, the variable-length read/write module 101 transmits a read request specifying a logical address corresponding to the variable-length data, to the SSD 3.

When the host request processing module 21 of the SSD 3 receives the variable-length data read request from the host 2, the host request processing module 21 refers to the variable-length LUT 32 and acquires a physical address indicating a location (physical storage location) on the NAND flash memory 5 and a length of the variable-length data, from an LUT entry corresponding to the logical address specified by the read request (Step S21). In Step S21, the host request processing module 21 may transmit the logical address specified by the read request to the variable-length LUT management module 22 and may inquire the variable-length LUT management module 22 about the location on the NAND flash memory 5 and the length of data to be read.

The host request processing module 21 reads data from the NAND flash memory 5 based on the acquired physical address and the acquired data length (Step S22). In Step S22, the host request processing module 21 reads the data stored in a region on the NAND flash memory 5 which is specified by the acquired physical address and the acquired data length, from the NAND flash memory 5.

Subsequently, the host request processing module 21 returns the read data, the data length and a command completion response to the host 2.

FIG. 10 shows another example of the configuration of the variable-length lookup table 32.

In the variable-length LUT 32 shown in FIG. 10, a key of a key-value store is used as the logical address indicating the logical storage location of the SSD 3. The logical address included in the write/read request transmitted from the host 2 to the SSD 3 indicates a certain key.

Each LUT entry of the variable-length LUT 32 includes a key field for managing a key specified by the host 2, a location field for managing a location (physical storage location) on the NAND flash memory 5 in which variable-length data (a value alone or a key-value pair) corresponding to the key is stored, and a length field for managing a length of the variable-length data.

If variable-length data D11 corresponding to a key "DDD" is written to a region starting from the beginning of a block BLK1, the key "DDD", a physical address indicating a starting location X1 of the block BLK1, and a length of the variable-length data D11 (here, the length is represented as "5") are stored in an LUT entry.

If variable-length data D12 corresponding to a key "AAA" is written to a region starting from a location X2 of the block BLK1, the key "AAA", a physical address indicating the location X2, and a length of the variable-length data D12 (here, the length is represented as "7") are stored in an LUT entry.

If variable-length data D13 corresponding to a key "XXX" is written to a region starting from a location X3 of the block BLK1, the key "XXX", a physical address indicating the location X3, and a length of the variable-length data D13 (here, the length is represented as "2") are stored in an LUT entry.

If variable-length data D21 corresponding to a key "BBB" is stored in a region starting from the beginning of a block BLK2, the key "BBB", a physical address indicating a starting location Y1 of the block BLK2, and a length of the variable-length data D21 (here, the length is represented as "3") are stored in an LUT entry.

If variable-length data D22 corresponding to a key "CCC" is written to a region starting from a location Y2 of the block BLK2, the key "CCC", a physical address indicating the location Y2 of the block BLK2, and a length of the variable-length data D22 (here, the length is represented as "9") are stored in an LUT entry.

In the case of using the variable-length LUT 33 shown in FIG. 10, based on a key included in a read request or a write request, an LUT entry corresponding to the key is searched. Then, the searched LUT entry is referred to or updated. In the case of writing data, if an LUT entry corresponding to a key included in a write request does not exist, a physical address indicating a physical storage location on the NAND flash memory 5 to which variable-length data corresponding to the key is written, and a length of the variable-length data are stored in an unused LUT entry.

Figure 11:
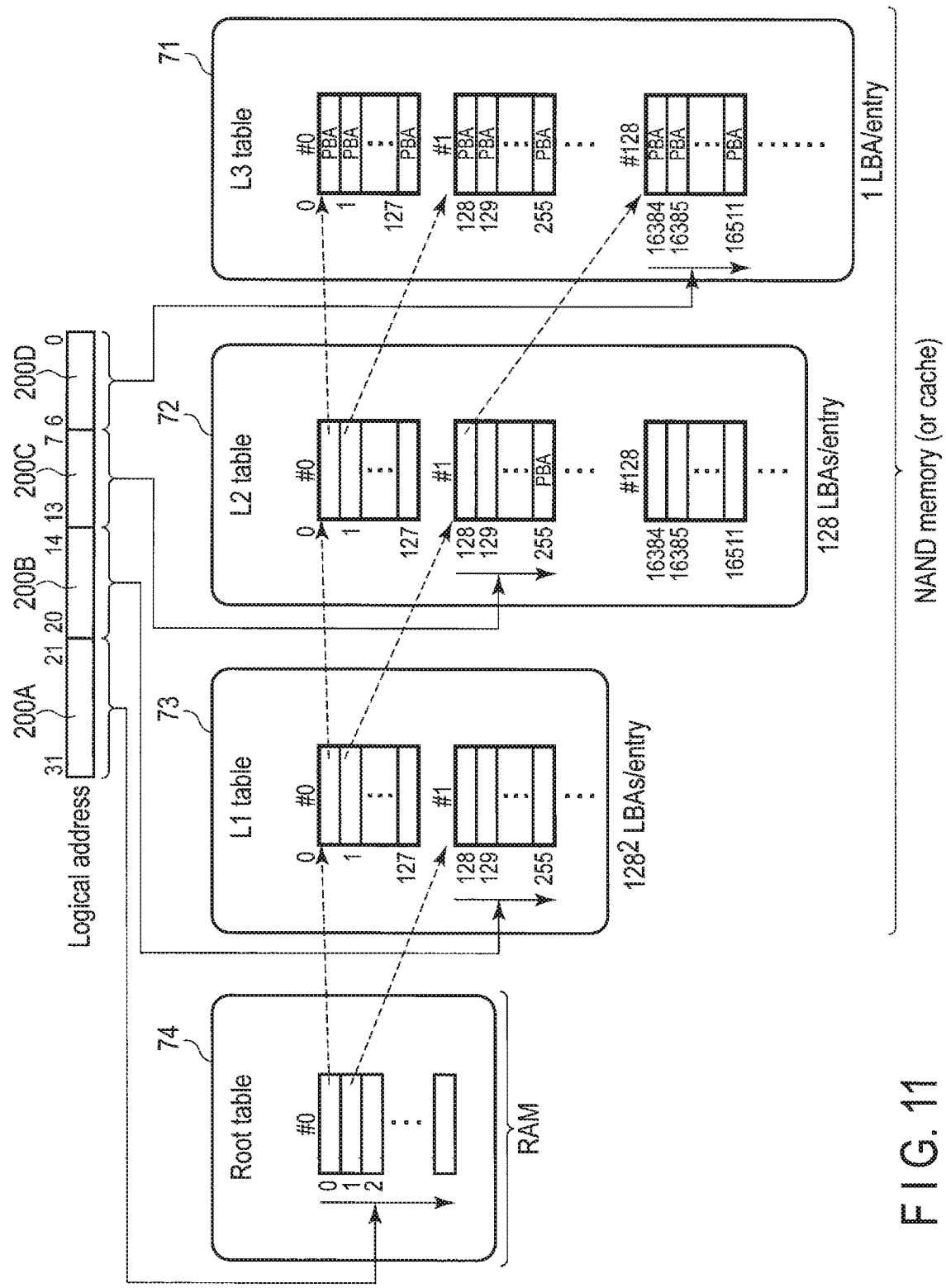
FIG. 11 is a diagram showing an example of the configuration of a hierarchical lookup table (multilevel lookup table) managed by the memory system of the embodiment.

FIG. 11 shows an example of the configuration of a hierarchical lookup table (multilevel lookup table).

The hierarchical lookup table shown in FIG. 11 includes a plurality of hierarchical tables. These tables are used for multistage logical-to-physical address translation. The number of tables included in the hierarchical lookup table corresponds to the number of stages in the logical-to-physical address translation. The number of tables included in the hierarchical lookup table may be two (the number of stages in the address translation may be two), may be three (the number of stages in the address translation may be three), or may be four or more (the number of stages in the address translation stages may be four or more).

For example, the hierarchical lookup table may be a three-level address translation table for translating a logical address into a physical address by three-stage address translation. In this case, the hierarchical lookup table may include hierarchical three tables used respectively in three address translation stages, namely, a level 1 table (L1 table) 73, a level 2 table (L2 table) 72 and a level 3 table (L3 table) 71.

The L3 table 71 is an address translation table including a plurality of LUT entries corresponding to logical addresses, respectively. The L3 table 71 includes a plurality of data portions (a data portion #0, a data portion #1, ..., a data portion #128, ...). In other words, the L3 table 71 is divided into these data portions (the data portion #0, the data portion #1, ..., the data portion #128, ...). These data portions have the same fixed size.

One data portion (table data portion) of the L3 table 71 can include 128 LUT entries (that is, 128 physical addresses and 128 data lengths), for example. That is, one LBA is covered by one LUT entry in the L3 table 71.

The locations on the NAND flash memory 5 in which the data portions (the data portion #0, the data portion #1, ..., the data portion #128, ...) of the L3 table 71 are stored are individually managed by the L2 table 72.

The L2 table 72 also include a plurality of data portions (a data portion #0, a data portion #1, ..., a data portion #128, ...) having the same fixed size as the data portions of the L3 table 71. In other words, the L2 table 72 is divided into these data portions (the data portion #0, the data portion #1, ..., the data portion #128, ...).

Each data portion of the L2 table 72 includes a plurality of LUT entries, for example, 128 LUT entries. Each LUT entry shows a location on the NAND flash memory 5 in which one data portion in the L3 table 71 is stored. That is, 128 LBAs are covered by one LUT entry in the L2 table 72.

The locations on the NAND flash memory 5 in which the data portions (the data portion #0, the data portion #1, ..., the data portion #128, ...) of the L2 table 72 are stored are individually managed by the L1 table 73.

The L1 table 73 also include a plurality of data portions (a data portion #0, a data portion #1, ...) having the same fixed size as the data portions of the L3 table 71. In other words, the L1 table 73 is divided into these data portions (the data portion #0, the data portion #1, ...).

Each data portion of the L1 table 73 includes a plurality of LUT entries, for example, 128 LUT entries. Each LUT entry shows a location on the NAND flash memory 5 in which one data portion in the L2 table 72 is stored. That is, $128^2$ LBAs are covered by one LUT entry in the L1 table 73.

The locations on the NAND flash memory 5 in which the data portions (the data portion #0, the data portion #1, ...) of the L1 table 73 are stored are managed by system management information referred to as a root table 74. The root table 74 may be loaded from the NAND flash memory 5 to the RAM 6 when the SSD 3 receives power supply, for example, and from then on, the root table 74 may be constantly maintained on the RAM 6.

The root table 74 may include a plurality of entries. Each entry indicates a location on the NAND flash memory 5 in which one data portion in the L1 table 73 is stored.

A translation target logical address is divided into four subfields, namely, a subfield 200A, a subfield 200B, a subfield 200C and a subfield 200D.

Next, the logical-to-physical address translation processing to be executed by using the hierarchical lookup table shown in FIG. 11 will be briefly described. Here, to simplify explanations, it is assumed that each table is read from the NAND flash memory 5.

<Logical-to-Physical Address Translation at First Stage>

Firstly, the root table 74 is referred to by using the subfield 200A in the translation target logical address, and a physical address (location on the NAND flash memory 5) of a specific data portion in the L1 table 73 is acquired. The specific data portion of the L1 table 73 is read from the NAND flash memory 5 based on the physical address.

Then, the specific data portion in the L1 table 73 is referred to by using the subfield 200B, and one entry is selected from the specific data portion in the L1 table 73. A physical address (location on the NAND flash memory 5) of one data portion in the L2 table 72 is stored in the selected entry. The data portion of the L2 table 72 is read from the NAND flash memory 5 based on the physical address.

<Logical-to-Physical Address Translation at Next Stage>

Next, the data portion of the L2 table 72 is referred to by using the subfield 200C in the translation target logical address, and one entry is selected from the data portion in the L2 table 72. A physical address (location on the NAND flash memory 5) of one data portion in the L3 table 71 is stored in the selected entry. The data portion of the L3 table 71 is read from the NAND flash memory 5 based on the physical address.

<Address Translation at Final Stage>

Subsequently, the data portion in the L3 table 71 is referred to by using the subfield 200D, and one entry is selected from the data portion in the L3 table 71. A physical address indicating a location on the NAND flash memory 5 in which variable-length data which is specified by a logical address included in a read request is stored, and a length of the variable-length data are stored in the selected entry. The variable-length data is read from the NAND flash memory 5 based on the physical address and the length.

According to the configuration of this hierarchical lookup table, the size of the storage region for storing this hierarchical lookup table can be reduced. It is because it is only necessary to secure storage regions corresponding to data portions in which physical addresses and lengths are actually stored on the NAND flash memory 5 or the RAM 6.

FIG. 12 shows an example of the hardware configuration of the SSD 3.

The SSD 3 includes a controller 4A and the NAND flash memory 5. The SSD 3 may include a random access memory, for example, a DRAM 6A.

The NAND flash memory 5 includes a memory cell array where a plurality of memory cells are arranged in a matrix. The NAND flash memory 5 may be a two-dimensional NAND flash memory or may be a three-dimensional NAND flash memory.

The memory cell array of the NAND flash memory 5 includes a plurality of blocks BLK0 to BLKm-1. Each of the blocks BLK0 to BLKm-1 is formed of a number of pages (here, pages P0 to Pn-1). The blocks BLK0 to BLKm-1 function as erase units. The block may be referred to as a "physical block" or an "erase block". Each of the pages P0 to Pn-1 includes a plurality of memory cells connected to the same word line. The pages P0 to Pn-1 are data write/read units.

The controller 4A is an LSI configured to control the NAND flash memory 5. The controller 4A is electrically connected to the NAND flash memory 5 via a NAND interface 13 such as Toggle or Open NAND flash Interface (ONFI). The NAND interface 13 functions as a NAND control circuit configured to control the NAND flash memory 5.

The NAND flash memory 5 includes a plurality of NAND flash memory chips (dies) as shown in FIG. 13. The NAND flash memory chips can operate independently from each other. Therefore, the NAND flash memory chips function as parallel operation units. FIG. 13 shows a case where the NAND interface 13 is connected to 16 channels Ch.1 to Ch.16, and each of the 16 channels Ch.1 to Ch.16 is connected to two NAND flash memory chips. In this case, 16 NAND flash memory chips #1 to #16 connected to the channels Ch.1 to Ch.16 may be formed as a bank #0, and the other 16 NAND flash memory chips #17 to #32 connected to the channels Ch.1 to Ch.16 may be formed as a bank #1. The banks function as parallel operation units for operating a plurality of memory modules in parallel by bank interleaving. In the example of the configuration shown in FIG. 13, a maximum of 32 NAND flash memory chips can be operated in parallel by 16 channels and the bank interleaving using two banks.

The controller 4A groups a plurality of blocks into a large unit (referred to as a "logical block" or a "superblock"). For example, one logical block may include a total of 32 blocks which are selected from NAND flash memory chips #1 to #32, respectively, but this is in no way restrictive. In FIG. 13, blocks having a hatch pattern represent blocks (physical blocks) included a certain logical block. Each NAND flash memory chip can be identified by a channel number and a bank number. Further, each block (physical block) can be identified by a physical block number.

Note that the NAND flash memory chips #1 to #32 may have a multi-plane configuration. For example, if the NAND flash memory chips #1 to #32 have such a multi-plane configuration that each of the NAND flash memory chips #1 to #32 has two planes, one logical block may include a total of 64 blocks which are selected from 64 planes corresponding to the NAND flash memory chips #1 to #32, respectively.

Here, as shown in FIG. 14, it is assumed that a certain logical block includes 32 blocks (a block Blk2 in the NAND flash memory chip #1, a block Blk3 in the NAND flash memory chip #2, a block Blk7 in the NAND flash memory chip #3, a block Blk4 in the NAND flash memory chip #4, a block Blk6 in the NAND flash memory chip #5, . . . , a block Blk3 in the NAND flash memory chip #32).

In the case of writing data to this logical block, the controller 4A may write data in order from a page 0 of the block Blk2 in the NAND flash memory chip #1, a page 0 of the block Blk3 in the NAND flash memory chip #2, a page 0 of the block Blk7 of the NAND flash memory chip #3, a page 0 of the block Blk4 in the NAND flash memory chip #4, a page 0 of the block Blk6 in the NAND flash memory chip #5, . . . , a page 0 of the block Blk3 in the NAND flash memory chip #32. In this way, data can be written to a maximum of 32 pages in parallel. In the case of reading data read from this logical block also, data can be read from a maximum of 32 pages in parallel.

The physical storage location managed by each LUT entry may be represented by a logical block number, a block number (physical block number) and a location in the block, may be represented by a logical block number, a block number (physical block number), a page number and a location in the page, or may be represented by a logical block number and a location in the logical block.

Next, the configuration of the controller 4A shown in FIG. 12 will be described.

The controller 4A may function as a flash translation layer (FTL) configured to execute data management and block management of the NAND flash memory 5. The data management executed by the FTL includes (1) management of mapping information indicating the correspondences between logical addresses and physical addresses of the NAND flash memory 5, (2) processing for hiding a page-by-page read/write operation and a block-by-block erase operation, etc. The logical address is an address which the host 2 uses for specifying an address of the SSD 3. The LBA (logical block address (addressing)) is used as the logical address.

The mapping between the logical addresses and the physical addresses is managed by the variable-length LUT 32. The controller 4A manages the mapping between the logical addresses and the physical addresses by using the variable-length LUT. The variable-length LUT 32 may be loaded from the NAND flash memory 5 to the DRAM 6 when the SSD 3 is powered on.

The operation for writing data to a page can be performed only once in one erase cycle. Therefore, the controller 4A writes updated data corresponding to a logical address not in a physical storage location in which previous data corresponding to the logical address is stored but in another physical storage location. Subsequently, the controller 4 updates the variable-length LUT 32 and associates the logical address with the other physical storage location, and invalidates the previous data.

The block management includes bad block management, wear leveling, garbage collection, etc. The wear leveling is the operation for leveling the wear of blocks (physical blocks). In the garbage collection, to increase the number of free blocks available for writing data, valid data are copied from some target blocks containing a mixture of valid data and invalid data to another block (for example, a free block). Here, the valid data means that the data is referred to from the variable-length LUT 32 (that is, the data is tied with a logical address as the latest data) and the data has a chance of being read by the host 2 afterward. The invalid data means that the data no longer has a change of being read by the host 2. For example, data which is associated with a logical address is the valid data, and data which is not associated with a logical address is the invalid data.

Subsequently, the controller 4 updates the lookup table (LUT) 32 and maps the logical addresses of copied valid data to copy destination physical addresses, respectively. A block which only contains invalid data after valid data have been copied to another block is released as a free block. In this way, after an erase operation, this block can be reused.

The controller 4A may include a host interface 11, a CPU 12, the NAND interface 13, a DRAM interface 14, etc. The CPU 12, the NAND interface 13 and the DRAM interface 14 may be connected to each other via a bus 10.

The host interface 11 receives various commands from the host 2. The commands include a variable-length data write command and a variable-length data read command.

The CPU 12 is a processor configured to control the host interface 11, the NAND interface 13 and the DRAM interface 14. When the SSD 3 is powered on, the CPU 12 loads control programs (firmware) stored in the NAND flash memory 5 to the DRAM 6 and executes the firmware, and performs various processing. The CPU 12 can execute, for example, command processing for processing various commands from the host 2, etc., in addition to the above-described FTL processing. The operation of the CPU 12 is controlled by the above-described firmware executed by the CPU 12. Note that part or all of the FTL processing and the command processing may be executed by dedicated hardware in the controller 4.

The CPU 12 can function as a host request processing module 21A, a variable-length LUT management module 22A and a namespace management module 23A. The host request processing module 21A executes the same processing as the processing executed by the host request processing module 21 shown in FIG. 1. The variable-length LUT management module 22A executes the same processing as the processing executed by the variable-length LUT management module 22 shown in FIG. 1.

The namespace management module 23A executes the above-described multi-namespace control function. The namespace management module 23A can create a namespace of a type #1 for handling fixed-length data and a namespace of a type #2 for handling variable-length data. The logical-to-physical address translation for the namespace of the type #1 is executed by using the fixed-length LUT 33. The logical-to-physical address translation for the namespace of type #2 is executed by using the variable-length LUT 32.

The DRAM interface 14 is a DRAM controller configured to execute access control of the DRAM 6. A storage region of the DRAM 6 is used for storing the write buffer (WB) 31 and the LUTs 32 and 33.

Next, the configuration of the host 2 will be described.

The host 2 is an information processing device configured to execute various programs. The programs executed by the information processing device include an application software layer 41, an operating system (OS) 42, a device driver 43, etc.

As is generally known, the operating system (OS) 42 is software configured to manage the whole host 2, control the hardware in the host 2 and execute control to enable an application to use the hardware and the SSD 3.

Various application software threads run on the application software layer 41. For example, the application software threads include client software, database software, a virtual machine, etc.

If the application software layer 41 needs to transmit a request such as a read command or a write command to the SSD 3, the application software layer 41 transmits the request to the OS 42. The OS 42 transmits the request to the device driver 43. The device driver 43 translates the request to a command (a read command, a write command, etc.). The drive driver 43 transmits the command to the SSD 3. When receiving a response from the SSD 3, the device driver 43 transmits the response to the OS 42. The OS 42 transmits the response to the application software layer 41.

A variable-length data read/write module 101A of the device driver 43 executes the same processing as the processing executed by the variable-length data read/write module 101 shown in FIG. 1.

Figure 15:
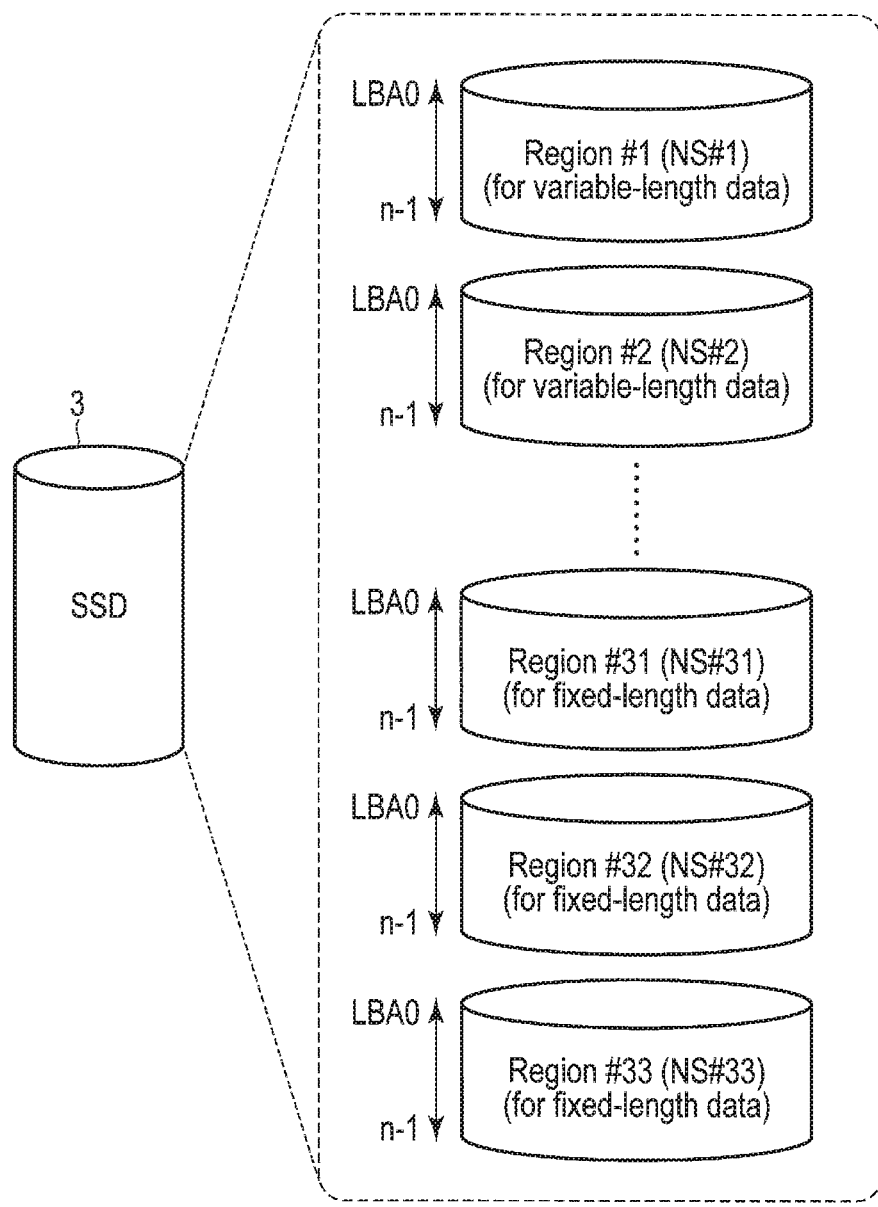
FIG. 15 is an explanatory diagram showing a plurality of regions acquired by logically dividing a nonvolatile memory of the memory system of the embodiment.

FIG. 15 shows a plurality of regions managed by the controller 4A.

The controller 4A manages a plurality of regions in the NAND flash memory 5, namely, a region #1, a region #2, . . . , a region #31, a region #32 and a region #33. Each region can be realized by a namespace. Each namespace is a region of a kind (storage region) in the NAND flash memory 5, and a logical address space (LBA space) is allocated. Each namespace is identified by an identifier of the namespace. If each region is realized by a namespace, an LBA range (LBA 0 to LBA n−1) is allocated to each region. The size of the LBA range (that is, the number of LBAs) varies from region to region (from namespace to namespace). Each LBA range starts from an LBA 0.

For example, each of the region #1 (namespace NS#1), the region #2 (namespace NS#2), . . . may be used for storing variable-length data. Further, the region #31 (namespace NS#31), the region #32 (namespace NS#32) and the region #33 (namespace NS#33) may be used for storing fixed-length data.

FIG. 16 shows the relationships between a plurality of regions, logical address spaces (LBA spaces) corresponding to these regions, and lookup tables corresponding to these regions.

A logical address space (LBA space) A1 with logical addresses from 0 to n−1 is allocated to the region #1 corresponding to the namespace NS#1. A logical address space (LBA space) A2 with logical addresses from 0 to n−1 is allocated to the region #2 corresponding to the namespace NS#2. A logical address space (LBA space) A31 with logical addresses from 0 to n−1 is allocated to the region #31 corresponding to the namespace NS#31. A logical address space (LBA space) A32 with logical addresses from 0 to n−1 is allocated to the region #32 corresponding to the namespace NS#32. A logical address space (LBA space) A33 with logical addresses from 0 to n−1 is allocated to the region #33 corresponding to the namespace NS#33.

In the present embodiment, the lookup table LUT is divided by region, i.e., by namespace. That is, logical-to-physical address translation for the region #1 (namespace NS#1) is executed by using a variable-length LUT #1, and logical-to-physical address translation for the region #2 (namespace NS#2) is executed by using a variable-length LUT #2. Further, logical-to-physical address translation for the region #31 (namespace NS#31) is executed by using a variable-length LUT #31, logical-to-physical address translation for the region #32 (namespace NS#32) is executed by using a variable-length LUT #32, and logical-to-physical address translation for the region #33 (namespace NS#33) is executed by using a variable-length LUT #33.

Arbitrary-length data can be written to an arbitrary logical address in each of the region #1 (namespace NS#1) and the region #2 (namespace NS#2).

As described above, according to the present embodiment, the SSD 3 stores information indicating from which physical storage location on the NAND flash memory 5 data is stored and in what length the data is stored, in the variable-length LUT 32, and in this way, arbitrary-length data can be stored in a physical storage location corresponding to an arbitrary logical address. In other words, according to the variable-length LUT 32, a physical storage region having a size corresponding to an arbitrary data length specified by the host 2 can be allocated to a physical storage location in the SSD 3 corresponding to a certain logical address.

Consequently, it is possible to solve inefficiency such as (1) an increase of the processing time of the CPU of the host, (2) an increase of the memory access time by reading/writing metadata, (3) an increase of the consumption of a memory resource by wring metadata/dummy data, (4) an increase of write amplification by an increase of the consumption of the memory resource, and (5) a reduction of the lifespan of the SSD by the increase of write amplification.

In the present embodiment, a NAND flash memory is described as a nonvolatile memory. However, the function of the embodiment can also be applied to various non-volatile memories such as a magnetoresistive random access memory (MRAM), a phase change random access memory (PRAM), a resistive random access memory (ReRAM) and a ferroelectric random access memory (FeRAM).

Further, the SSD 3 may be used as one of a plurality of SSDs provided in a storage array. The storage array may be connected to an information processing device such as a server computer via a cable or network. The storage array includes a controller which controls the SSDs in the storage array. If the SSD 3 is applied to the storage array, the controller of the storage array may function as the host 2 of the SSD 3.

Further, a field for storing a flag indicating fixed-length data/variable-length data may be added to each LUT entry. In this way, the read/write operation of variable-length data and the read/write operation of fixed-length data can be controlled by one LUT.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
a nonvolatile memory; and
a controller electrically connected to the nonvolatile memory, the controller being configured to:
manage a logical-to-physical address translation table including a plurality of entries corresponding to a plurality of logical addresses respectively;
receive, from the host, a write request specifying a first logical address and a length of first data, the first logical address being associated with the first data;
write the first data to the nonvolatile memory; and
store, in an entry of the logical-to-physical address translation table corresponding to the first logical address, a first physical address and the length of the first data, the first physical address indicating a physical location of the nonvolatile memory to which the first data is written.

2. The memory system of claim 1, wherein
the controller is further configured to:
receive, from the host, a read request specifying the first logical address;
acquire the first physical address and the length from the logical-to-physical address translation table; and
read the first data from the nonvolatile memory on the basis of the acquired first physical address and the acquired length.

3. The memory system of claim 1, wherein the physical location of the nonvolatile memory is represented by a block number of a block in the nonvolatile memory and a location inside the block.

4. The memory system of claim 1, wherein the physical location of the nonvolatile memory is represented by a block number of a block in the nonvolatile memory, a page number of a page in the block, and a location inside the page.

5. The memory system of claim 1, wherein a length of data corresponding to a unit of each logical address is variable.

6. The memory system of claim 1, wherein
when a first data portion of the first data is written to a first block of the nonvolatile memory and a second data portion of the first data is written to a second block of the nonvolatile memory,
the controller is further configured to store a first physical address, a length of the first data portion, a second physical address, and a length of the second data portion, in an entry of the logical-to-physical address translation table corresponding to the first logical address, the first physical address indicating a physical location of the first block to which the first data portion is written, the second physical address indicating a physical location of the second block to which the second data portion is written.

7. The memory system of claim 1, wherein
the logical-to-physical address translation table includes a first logical-to-physical address translation table and a second logical-to-physical address translation table,
the first logical-to-physical address translation table includes an entry, the entry of the first logical-to-physical address translation table including a location of the second logical-to-physical address translation table and not including information as to a size of the second logical-to-physical address translation table, and
the second logical-to-physical address translation table includes a plurality of entries, each of the entries of the second logical-to-physical address translation table including a logical address associated with data and a length of the data.

8. The memory system of claim 1, wherein
a physical storage region of the nonvolatile memory is allocated to the first logical address, and
the physical storage region allocated to the first logical address has a size corresponding to the length of the first data.

9. A method of controlling a nonvolatile memory, the method comprising:
managing a logical-to-physical address translation table including a plurality of entries corresponding to a plurality of logical addresses respectively;

receiving, from a host, a write request specifying a first logical address and a length of first data, the first logical address being associated with the first data;

writing the first data to the nonvolatile memory; and storing, in an entry of the logical-to-physical address translation table corresponding to the first logical address, a first physical address and the length of the first data, the first physical address indicating a physical location of the nonvolatile memory to which the first data is written.

10. The method of claim 9, further comprising:

receiving, from the host, a read request specifying the first logical address;

acquiring the first physical address and the length from the logical-to-physical address translation table; and reading the first data from the nonvolatile memory on the basis of the acquired first physical address and the acquired length.

11. The method of claim 9, wherein the physical location of the nonvolatile memory is represented by a block number of a block in the nonvolatile memory and a location inside the block.

12. The method of claim 9, wherein the physical location of the nonvolatile memory is represented by a block number of a block in the nonvolatile memory, a page number of a page in the block, and a location inside the page.

13. The method of claim 9, wherein a length of data corresponding to a unit of each logical address is variable.

14. The method of claim 9, further comprising:

when a first data portion of the first data is written to a first block of the nonvolatile memory and a second data portion of the first data is written to a second block of the nonvolatile memory, storing a first physical address, a length of the first data portion, a second physical address, and a length of the second data portion, in an entry of the logical-to-physical address translation table corresponding to the first logical address, the first physical address indicating a physical location of the first block to which the first data portion is written, the second physical address indicating a physical location of the second block to which the second data portion is written.

15. The method of claim 9, wherein the logical-to-physical address translation table includes a first logical-to-physical address translation table and a second logical-to-physical address translation table, the first logical-to-physical address translation table includes an entry, the entry of the first logical-to-physical address translation table including a location of the second logical-to-physical address translation table and not including information as to a size of the second logical-to-physical address translation table, and the second logical-to-physical address translation table includes a plurality of entries, each of the entries of the second logical-to-physical address translation table including a logical address associated with data and a length of the data.

16. The method of claim 9, wherein a physical storage region of the nonvolatile memory is allocated to the first logical address, and the physical storage region allocated to the first logical address has a size corresponding to the length of the first data.

* * * * *